(12) United States Patent  
Moriya et al.

(10) Patent No.: US 6,704,642 B2
(45) Date of Patent: Mar. 9, 2004

(54) VALVE TIMING CONTROL APPARATUS AND METHOD OF INTERNAL COMBUSTION ENGINE

(75) Inventors: Yoshihito Moriya, Nagoya (JP); Hiroyuki Kawase, Okazaki (JP); Hideo Nagaosa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 534 days.

(21) Appl. No.: 09/785,228

(22) Filed: Feb. 20, 2001

(65) Prior Publication Data
US 2002/0010540 A1 Jan. 24, 2002

(30) Foreign Application Priority Data

Mar. 1, 2000 (JP) .......................... 2000-055558
Jan. 9, 2001 (JP) .......................... 2001-001553

(51) Int. Cl.$^7$ .............................. F02D 13/02; F01L 1/34
(52) U.S. Cl. ................................... 701/115; 123/90.15
(58) Field of Search ................. 701/115, 102, 701/567, 568; 123/90.15, 90.17, 90.31

(56) References Cited

U.S. PATENT DOCUMENTS

| 4,811,698 A | * | 3/1989 | Akasaka et al. | ......... 123/90.17 |
| 4,960,084 A | * | 10/1990 | Akasaka et al. | ......... 123/90.17 |
| 5,562,071 A |   | 10/1996 | Urushihata et al. | ...... 123/90.15 |
| 5,592,909 A |   | 1/1997 | Tsuruta | ................... 123/90.17 |
| 5,611,304 A |   | 3/1997 | Shinojima | ............... 123/90.15 |
| 5,678,515 A |   | 10/1997 | Kato et al. | ............... 123/90.15 |
| 5,738,056 A |   | 4/1998 | Mikame et al. | ........... 123/90.17 |
| 5,937,808 A |   | 8/1999 | Kako et al. | ............... 123/90.15 |
| 6,155,219 A | * | 12/2000 | Fukuhara et al. | ........ 123/90.17 |
| 6,263,843 B1 | * | 7/2001 | Todo et al. | .............. 123/90.17 |
| 6,591,799 B1 | * | 7/2003 | Hase et al. | .............. 123/90.17 |

FOREIGN PATENT DOCUMENTS

| EP | 0 654 588 A1 |   | 5/1995 |   |
| EP | 0 717 171 A1 |   | 6/1996 |   |
| EP | 0 737 799 A1 |   | 10/1996 |   |
| EP | 0 818 640 A1 |   | 1/1998 |   |
| EP | 0 821 139 A1 |   | 1/1998 |   |
| EP | 0 845 584 A1 |   | 3/1998 |   |
| EP | 1 143 113 A2 | * | 10/2001 | ............ F01L/1/34 |
| JP | 8-284699 |   | 10/1996 |   |
| JP | 9-324613 |   | 12/1997 |   |
| JP | 11-241608 |   | 9/1999 |   |

* cited by examiner

Primary Examiner—Hieu T. Vo
(74) Attorney, Agent, or Firm—Oliff & Berridge PLC

(57) ABSTRACT

A valve timing control apparatus of an internal combustion engine that includes a biasing device that applies bias force to a camshaft of intake or exhaust valves so as to bring the valve timing of the engine into a predetermined state when the valve timing is in a predetermined range, for example, when the valve timing is on the retard side of the engine start valve timing with which the engine is started is controlled by a controller that controls the valve timing in view of the bias force of the biasing device.

44 Claims, 9 Drawing Sheets

VALVE TIMING CONTROL APPARATUS AND METHOD OF INTERNAL COMBUSTION ENGINE

INCORPORATION BY REFERENCE

The disclosures of Japanese Patent Applications No. 2000-055558 filed on Mar. 1, 2000 and No. 2001-001553 filed on Jan. 9, 2001 each including the specification, drawings and abstract are incorporated by reference in its entirety.

BACKGROUND OF THE INVENTION

1. Field of the Invention

The invention relates to a valve timing control apparatus and method of an internal combustion engine.

2. Description of Related Art

Conventional internal combustion engines, such as engines installed on vehicles, are provided with a valve timing apparatus that controls the valve timing of the engine in an attempt to improve the output performance and enhance the emission quality, for example. Such a valve timing control apparatus includes a variable valve timing mechanism that is actuated by hydraulic pressure to change the valve timing of the engine. The variable valve timing mechanism includes, for example, a movable member connected to an intake camshaft of the engine, and timing advance-side hydraulic chambers and timing retard-side hydraulic chambers that are provided so as to sandwich the movable member therebetween. By selectively supplying hydraulic fluid to these hydraulic chambers so as to move the movable member by hydraulic pressure, the rotational phase (or angular position) of the camshaft relative to that of the crankshaft of the engine is changed. Thus, the relative rotation phase of the camshaft is changed in this manner, so that the valve timing of the intake valves of the engine is changed.

At the time of the start of the internal combustion engine, hydraulic fluid has been discharged from the hydraulic fluid chambers. Therefore, even if the hydraulic fluid begins to be supplied to the hydraulic chambers at the same time that the engine is started, a certain period of time is required before the movable member can be moved by hydraulic pressure. During this period, therefore, the valve timing of the intake valves cannot be controlled. Furthermore, since hydraulic pressure does not act on the movable member, the relative rotational phase of the camshaft (valve timing) is brought into the most retarded state due to reaction forces resulting from the opening and closing actions of the intake valves. In order to achieve good engine performance at the start of the engine, therefore, it may be desirable to set a (limited) control range of the valve timing of the intake valves so that valve timing suitable for the start of the engine (hereinafter, referred to as "engine start valve timing") can be obtained when the valve timing is brought into the most retarded state.

However, if the control range of the valve timing is set so as to satisfy the aforementioned requirement, the control range is undesirably reduced, thus making it difficult to optimally control the valve timing over the entire operating region of the engine. In order to suppress the reduction in the control range of valve timing control while optimizing the valve timing at the time of the start of the engine, it has been proposed to fix the valve timing of the intake valves to a state in which the valve timing of the intake valves is advanced by a certain amount away from the most retarded state when the engine is started. An example of such a valve timing control apparatus that is adapted for fixing the valve timing as mentioned above is disclosed in Japanese Patent laid-open Publication (Kokai) No. 11-241608.

The apparatus disclosed in the aforementioned publication includes a spring that urges or biases a movable member so as to bring the valve timing of the intake valves to a predetermined state between the most retarded state and the most advanced state when the valve timing is currently on the retard side of the predetermined state. Then, the control range of the valve timing control is set so that the predetermined state of the valve timing becomes the engine start valve timing. Furthermore, the apparatus includes a stopper mechanism that fixes the valve timing of the intake valves when the valve timing is placed in the predetermined state (engine start valve timing) under the bias force of the spring.

In the valve timing control apparatus disclosed in the aforementioned publication, the valve timing of the intake valves is set to the engine start valve timing by the bias force of the spring at the time of the start of the engine, and the valve timing in this state is fixed by the stopper mechanism. Since the valve timing of the intake valves is fixed to the engine start valve timing upon the start of the engine in this manner, good engine performance can be achieved at the time of the start of the engine. Furthermore, when the hydraulic chambers of the variable valve timing mechanism become filled with hydraulic fluid after the engine is started, the hydraulic pressure thus developed operates to discontinue the fixed state of the valve timing established by the stopper mechanism. After the fixed state of the valve timing is discontinued, it becomes possible to optimally control the valve timing over the entire operating region of the engine by performing valve timing control over the entire control range of the valve timing control.

When the valve timing control apparatus disclosed in the aforementioned publication controls the valve timing to be the retard side of the engine start valve timing, the bias force of the spring acts on the camshaft (movable member) in the timing advancing direction. The bias force of the spring gradually increases as the relative rotational phase of the camshaft (valve timing) shifts toward the most retarded position. When the valve timing is controlled in a state in which the bias force of the spring is acting on the camshaft, the bias force, which changes with the relative rotational phase of the camshaft, adversely affects the valve timing control.

SUMMARY OF THE INVENTION

It is therefore an object of the invention to provide a valve timing control apparatus of an internal combustion engine that is capable of accurately controlling the valve timing irrespective of bias force applied by a biasing device, such as a spring, which biases the valve timing toward a predetermined state between the most retarded state and the most advanced state.

To accomplish the above and/or other objects, one aspect of the invention provides a valve timing control apparatus of an internal combustion engine that includes a biasing device that exerts a bias force so as to bring valve timing of the engine into a predetermined state when the valve timing is in a predetermined range, which control apparatus includes a controller that controls the valve timing while taking into account the bias force of the biasing device.

In the apparatus constructed as described above, even where the biasing device applies a bias force to, for example, a camshaft of intake valves, the valve timing is controlled while taking into account the bias force of the biasing device. Therefore, the valve timing can be accurately controlled irrespective of the bias force exerted by the biasing device.

In one preferred embodiment of the invention as described above, the predetermined state is between a most retarded state and a most advanced state, and the biasing device exerts the bias force so as to bring the valve timing of the engine into the predetermined state when the valve timing is on a retard side of the predetermined state. In this embodiment, the controller controls the valve timing while taking into account the bias force of the biasing device at least when the valve timing is on the retard side of the predetermined state.

With the above arrangement, while the bias force is applied by the biasing device when the valve timing is on the retard side of the predetermined state, the valve timing control is performed taking into account the biasing force, and the valve timing can be appropriately controlled regardless of the bias force.

In another preferred embodiment of the invention, the controller sets a target value of the valve timing in accordance with an operating state of the engine, and calculates a control amount used for controlling the valve timing so that the valve timing approaches the target value. The controller then calculates the control amount while taking into account the bias force of the biasing device.

Thus, the valve timing control is performed based on the control amount calculated while taking account of the bias force, and therefore the valve timing can be appropriately controlled regardless of the bias force of the biasing device.

In the above preferred embodiment, the controller may increase or decrease a control gain used for calculation of the control amount, based on an actual measurement value of the valve timing and said target value, so that the actual measurement value approaches the target value, and may correct the control gain in accordance with the bias force of the biasing device. Then, the controller may calculate the control amount used for controlling the valve timing.

As described above, the control amount used for valve timing control is calculated based on the control gain so that the actual measurement value of the valve timing approaches the target value. In this connection, the characteristic of the rate of change of the valve timing during the valve timing control differs between when the valve timing is in a range in which the bias force is applied and when the valve timing is in a range in which the bias force is not applied. If the valve timing changes from the region in which the bias force is not applied by the biasing device to the region in which the bias force is applied, for example, the characteristic of the rate of change of the valve timing becomes inappropriate, and the valve timing cannot be appropriately controlled. With the arrangement as described above, however, the control gain that is related to the characteristic of the rate of change of the valve timing is corrected in accordance with the bias force of the biasing device, and the control amount is calculated based on the control gain thus corrected, so that the valve timing can be appropriately controlled with the characteristic of the rate of change being maintained properly, regardless of the bias force of the biasing force.

In the preferred embodiment as described above, the controller may correct the control gain in accordance with the bias force of the biasing device only when the valve timing is in a range in which the biasing device exerts the bias force. With this arrangement, it may be possible to prevent the control gain from being unnecessarily corrected in accordance with the bias force when no bias force is applied by the biasing device.

Furthermore, the controller as indicated may calculate a correction value used for correction of the control gain in accordance with the bias force of the biasing device, by using the valve timing at the time of calculation.

The bias force exerted by the biasing device increases as the current valve timing shifts toward or approaches the most retarded state. If the correction value calculated in accordance with the current valve timing (i.e., the valve timing at the time of calculation) is used for calculation of the control gain as described above, it may be possible to maintain the characteristic of the rate of change of the valve timing in an appropriate state, by controlling the valve timing based on the control amount calculated from the control gain, even if the bias force of the biasing device changes with a change in the valve timing.

Preferably, the controller changes the control gain based on at least one parameter that influences the rate of change of the valve timing, in addition to the bias force of the biasing device.

When the valve timing is controlled to the target valve, a parameter or parameters that affects the rate of change of the valve timing, in addition to the bias force of the biasing device, may be changed. With the above arrangement, however, the control amount is calculated from the control gain that is changed based on the parameter(s), and the valve timing is controlled based on the control amount thus calculated, whereby the characteristic of the rate of change of the valve timing can be maintained in an appropriate state.

The controller as indicated above may control a variable valve timing mechanism based on the control amount, which variable valve timing mechanism is actuated by a pressure of hydraulic fluid so as to change the valve timing. In this case, the above-indicated at least one parameter based on which the controller changes the control gain may include one or more parameters that are related to a state of the hydraulic fluid.

With the above arrangement, the control amount is calculated from the control gain that is changed depending upon the parameter(s), and the valve timing is controlled based on the control amount thus calculated. Thus, even if the parameter(s) related to the state of the hydraulic fluid used for actuating the variable valve timing mechanism is/are changed, the characteristic of the rate of change of the valve timing can be maintained in an appropriate state.

In a still another preferred embodiment of the invention, the controller executes most retarded state learning to obtain a learned value that indicates a deviation of an actual measurement value of the valve timing when the valve timing is controlled to the most retarded state from a predetermined reference value, and calculates the control amount used for controlling the valve timing, based on the learned value. Here, the controller controls execution of the most retarded state learning while taking into account the bias force of the biasing device.

The control amount is normally calculated by using a learned value obtained by executing the most retarded state learning procedure, and the valve timing is controlled based on the control amount thus calculated, thereby reducing errors in the valve timing control due to differences among individual products, for example. However, the bias force is exerted by the biasing device when the valve timing is controlled to the most retarded position so as to implement the most retarded state learning procedure, which may result in erroneous learning of the most retarded state due to the influence of the bias force. This may make it difficult to appropriately control the valve timing. With the arrangement as described above, execution of the most retarded state learning is controlled while taking account of the bias force of the biasing device. When there is a possibility of erroneous learning of the most retarded state due to the influence of the bias force, therefore, the most retarded state learning procedure can be inhibited. By controlling execution of the most retarded state learning in this manner, the control amount (learned value) can be set to a value that accounts for the influence of the bias force, and the valve timing can be appropriately controlled without suffering from erroneous learning of the most retarded state of the valve timing.

In the above-described preferred embodiment, the biasing device may exert the bias force so as to advance the valve timing of the engine, and the controller may inhibit the most retarded state learning when an engine condition does not permit the valve timing to be controlled to the most retarded state against the bias force of the biasing device. This arrangement can avoid erroneous learning of the most retarded state of the valve timing, which may make it difficult to appropriately control the valve timing.

In the above preferred embodiment, the controller may control a variable valve timing mechanism based on the control amount, which variable valve timing mechanism is actuated by a pressure of hydraulic fluid so as to change the valve timing, and the controller may inhibit the most retarded learning when the hydraulic fluid used for actuating the variable valve timing mechanism is in a condition that does not permit the valve timing to be controlled to the most retarded state against the bias force of the biasing device. This arrangement can also avoid erroneous learning of the most retarded state of the valve timing, which may make it difficult to appropriately control the valve timing.

The valve timing control apparatus as described above may further include a memory that stores, as holding data, the control amount measured when a deviation of an actual measurement value of the valve timing from the target value thereof is maintained less than a predetermined value. In this apparatus, the controller corrects the holding data in accordance with the bias force of the biasing device, and calculates the control amount using the holding data.

The control amount used for valve timing control is calculated, using the holding data, so that the actual measurement value of the valve timing approaches the target value. The holding data provides a center with respect to which the control amount is increased or decreased. Also, the holding data is subjected to the influence of the bias force when the valve timing is in a region in which the bias force is applied by the biasing device, and is not subjected to the influence of the bias force when the valve timing is not in the same region. If the valve timing changes from a region in which the bias force is not applied by the biasing force to a region in which the bias force is applied by the biasing force, for example, the center with respect to which the control amount increases or decreases may deviate from an appropriate state or value since the holding data does not account for the influence of the bias force. Consequently, the valve timing may not be appropriately controlled. With the above arrangement of the invention, however, the control amount is calculated based on the holding data that is corrected in accordance with the bias force of the biasing device, and therefore the valve timing can be appropriately controlled without suffering from the deviation of the center of the increase/decrease of the control amount from its appropriate state.

In the above-described control apparatus, the controller may correct the holding data in accordance with the bias force only when the valve timing is in a range in which the biasing device exerts the bias force. With this arrangement, it may be possible to prevent the holding data from being unnecessarily corrected in accordance with the bias force when no bias force is applied by the biasing device.

Furthermore, the controller may correct the holding data so as to remove an influence of the bias force of the biasing device therefrom before the holding data derived from the measured control amount is stored into the memory, and may correct the holding data stored in the memory so as to add an influence of the bias force of the biasing device thereto before the holding data stored in the memory is used for calculation of the control amount.

With the above arrangement, the memory stores holding data that is free from the influence of the bias force exerted by the biasing device, and the influence of the bias force is added to the holding data when the control amount is calculated based on the holding data. Accordingly, the center with respect to which the control amount is increased or decreased can be maintained in an appropriate state even when, for example, the holding data is stored into the memory while the valve timing is in a region in which the bias force is not applied by the biasing device, and the holding data thus stored is used for calculation of the control amount when the valve timing is in a region in which the bias force is applied by the biasing device. Similarly, the center of the increase/decrease of the control amount can also be maintained in an appropriate state in the case where the holding data obtained in a region in which the biasing force is applied is stored into the memory, and the holding data thus stored is used for calculation of the control amount in a region in which the bias force is not applied.

Alternatively, the controller may inhibit the holding data from being stored into the memory when the valve timing is in a range in which the biasing device exerts the bias force, and correct the holding data stored in the memory so as to add an influence of the bias force of the biasing device thereto before the holding data stored in the memory is used for calculation of the control amount.

With the above arrangement, the memory stores holding data that is free from the influence of the bias force by the biasing device, and the influence of the bias force is added to the holding data as needed when the control amount is calculated based on the holding data. Accordingly, the center about which the control amount is increased or decreased can be maintained in an appropriate state even in the case where the holding data stored in the memory is used for calculation of the control amount when the valve timing is in a region in which the bias force is applied by the biasing device.

Alternatively, the controller may set the target value of the valve timing to a value that is outside a range in which the biasing device exerts the bias force, correct the holding data in accordance with the bias force of the biasing device, and calculate the control amount using the holding data.

With the above arrangement, the memory stores holding data that is free from the influence of the bias force by the biasing force, and the influence of the bias force is added to the holding data as needed when the control amount is calculated based on the holding data. Accordingly, the center about which the control amount is increased or decreased can be maintained in an appropriate state even in the case where the holding data stored in the memory is used for calculation of the control amount when the valve timing is in a region in which the bias force is applied.

Furthermore, the controller as indicated above may calculate a correction value used for correction of the holding data in accordance with the bias force of the biasing device, by using the valve timing at the time of calculation.

The bias force exerted by the biasing device increases as the current valve timing shifts toward or approaches the most retarded state. With the above arrangement, the holding data is corrected by using the correction value that is calculated based on the current valve timing (i.e., the valve timing at the time of calculation), and therefore the center with respect to which the control amount is increased or decreased, which is obtained from the holding data, can be maintained in an appropriate state even if the bias force of the biasing device changes with a change in the valve timing.

In a still another preferred embodiment of the invention, the valve timing control apparatus further includes a first memory that stores the control amount as first holding data at the time when a deviation of an actual measurement value of the valve timing from the target value thereof is maintained less than a predetermined value, under a condition that the valve timing is in a first range in which the biasing device exerts the bias force, and a second memory that stores the control amount as second holding data at the time when the deviation of the actual measurement value of the valve timing from the target value thereof is maintained less than the predetermined value, under a condition that the valve timing is in a second range in which the biasing device does not exert the bias force. In this embodiment, the controller calculates the control amount using the first holding data stored in the first memory when the valve timing is in the first range in which the biasing device exerts the bias force, and calculates the control amount using the second holding data stored in the second memory when the valve timing is in the second range in which the biasing device does not exert the bias force.

The control amount used for valve timing control is calculated, using the holding data, so that the actual measurement value of the valve timing approaches the target value. The holding data provides a center (or a reference value) with respect to which the control amount is increased or decreased. Also, the holding data is subjected to the influence of the bias force when the valve timing is in a region in which the bias force is applied by the biasing device, and is not subjected to the influence of the bias force when the valve timing is not in the same region. If the valve timing changes from a region in which the bias force is not applied by the biasing force to a region in which the bias force is applied by the biasing force, for example, the center with respect to which the control amount increases or decreases may deviate from an appropriate state or value since the holding data does not account for the influence of the bias force. Consequently, the valve timing may not be appropriately controlled. With the above arrangement of the invention, when the valve timing is in a region in which the bias force is applied by the biasing force, the holding data that accounts for the bias force is stored in the first memory, and the control amount used for valve timing control is calculated by using the holding data. When the valve timing is not in the above-mentioned region, on the other hand, the holding data that is free from the influence of the bias force is stored into the second memory, and the control amount is calculated by using the holding data. Thus, the storage of the holding data and the calculation of the control amount are performed separately when the valve timing is in a region in which the bias force is applied by the biasing device, and when the valve timing is not in the same region. Thus, the holding data used for calculation of the control amount can be set to a value that accounts for the bias force of the biasing device without suffering from the deviation of the center of the increase/decrease of the control amount from its appropriate state.

Preferably, the controller changes the holding data based on at least one parameter that influences the holding data, in addition to the bias force of the biasing device. With this arrangement, the control amount is calculated by using the holding data that is changed depending upon the parameter (s). Thus, the center about which the control amount is increased or decreased so as to control the valve timing to the target value can be maintained in an appropriate state even if the parameter(s) that influences the holding data, in addition to the bias force of the biasing device, changes.

In the control apparatus as described just above, the controller may control a variable valve timing mechanism based on the control amount, which to mechanism is actuated by a pressure of hydraulic fluid so as to change the valve timing, and the above-indicated at least one parameter based on which the controller changes the holding data may include one or more parameters that are related to a state of the hydraulic fluid.

With the above arrangement, the control amount is calculated from the holding data that is changed depending upon the parameter(s), and the valve timing is controlled based on the control amount thus calculated. Thus, the center about which the control amount is increased or decreased during control of the valve timing to the target value can be maintained in an appropriate state even if the parameter(s) related to the state of the hydraulic fluid for actuating the variable valve timing mechanism is/are changed.

BRIEF DESCRIPTION OF THE DRAWINGS

The foregoing and further objects, features and advantages of the invention will become apparent from the following description of preferred embodiments with reference to the accompanying drawings, in which like numerals are used to represent like elements and wherein.

DETAILED DESCRIPTION OF PREFERRED EMBODIMENTS

FIRST EMBODIMENT

A first embodiment of the invention when applied to an automobile engine will be described with reference to FIGS. 1 to 9.

Figure 1:
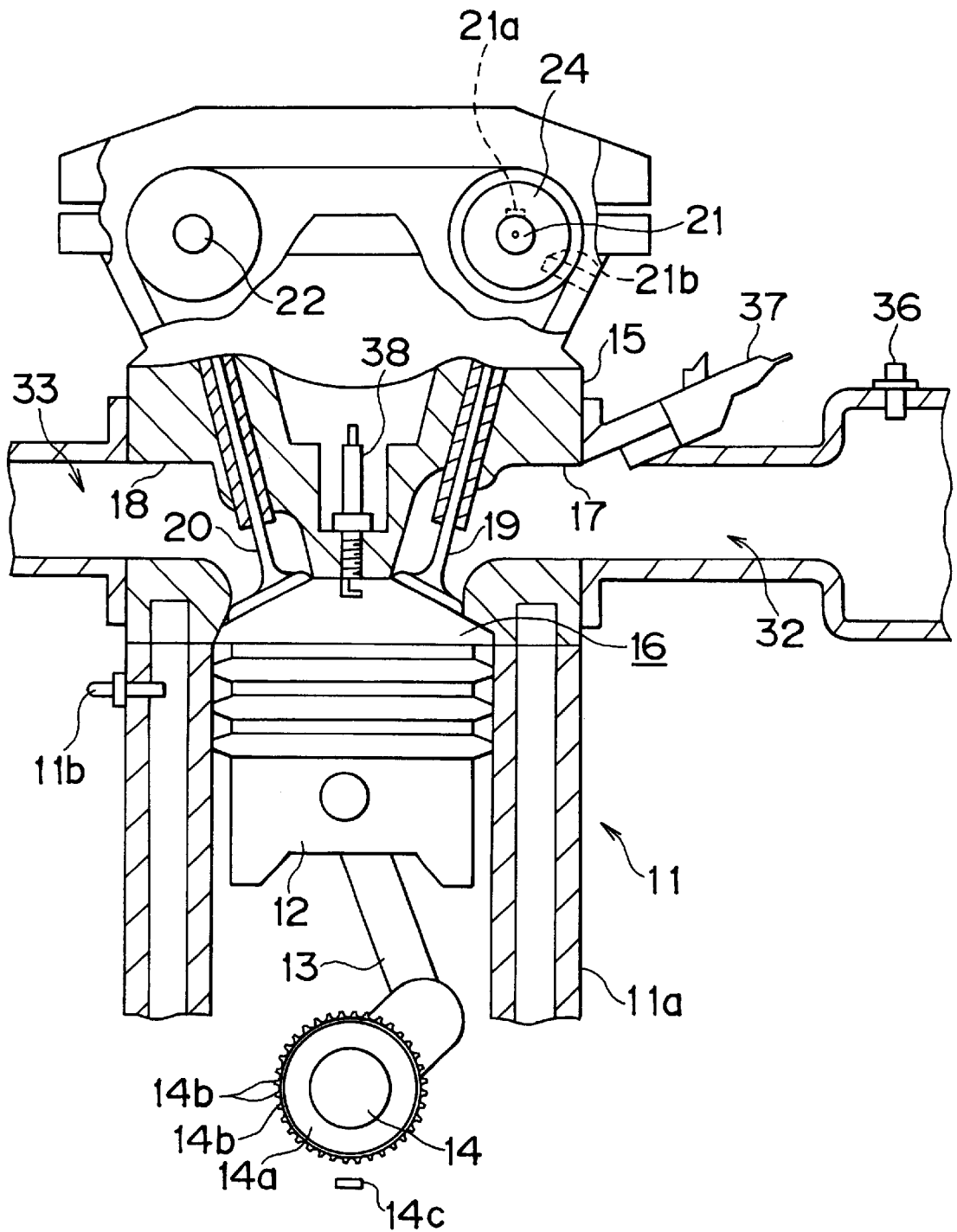
FIG. 1 is a schematic diagram illustrating the overall construction of an engine to which a valve timing control apparatus according to a first embodiment of the invention is applied.

As shown in FIG. 1, a cylinder block 11a of an engine 11 is provided with a total of four pistons 12 (only one of them is shown in FIG. 1) that are received in respective cylinders. The pistons 12 are connected to a crankshaft 14, that is, an output shaft of the engine 11, via corresponding connecting rods 13. Reciprocating movements of each piston 12 are converted into rotation of the crankshaft 14 by each connecting rod 13.

The crankshaft 14 is provided with a signal rotor 14a. An outer peripheral portion of the signal rotor 14a is provided with a plurality of protrusions 14b that are formed at each predetermined angle about an axis of the crankshaft 14. A crank position sensor 14c is provided at one side of the signal rotor 14a. As the protrusions 14b of the signal rotor 14a sequentially pass the crank position sensor 14c during rotation of the crankshaft 14, the crank position sensor 14c outputs a detection signal in the form of pulses corresponding to the respective protrusions 14b passing the sensor 14c.

The cylinder block 11a is provided with a water temperature sensor 11b for detecting the temperature of cooling water of the engine 11. A combustion chamber 16 is defined between each piston 12 and a cylinder head 15 disposed on the upper end of the cylinder block 11a. Intake ports 17 and exhaust ports 18 formed in the cylinder head 15 communicate with the combustion chambers 16. The intake ports 17 and the exhaust ports 18 also communicate with an intake passage 32 and an exhaust passage 33, respectively. Each intake port 17 and each exhaust port 18 are provided with an intake valve 19 and an exhaust valve 20, respectively.

An intake camshaft 21 and an exhaust camshaft 22 for opening and closing the intake valves 19 and the exhaust valves 20, respectively, are rotatably supported by the cylinder head 15. Rotation of the crankshaft 14 is transmitted to the intake and exhaust camshafts 21, 22 via gears, a chain, and so forth. As the intake camshaft 21 rotates, the intake valves 19 are opened and closed, thereby establishing and blocking communication between the intake ports 17 and the combustion chambers 16. As the exhaust camshaft 22 rotates, the exhaust valves 20 are opened and closed, thereby establishing and blocking communication between the exhaust ports 18 and the combustion chambers 16.

A cam position sensor 21b that detects a protrusion 21a provided on an outer peripheral surface of the intake camshaft 21 is provided on the cylinder head 15 at one side of the intake camshaft 21. As the intake camshaft 21 rotates, the protrusion 21a of the camshaft 21 passes the cam position sensor 21b, and the cam position sensor 21b outputs a detection signal at certain angular intervals in response to the passage of the protrusion 21a.

A vacuum sensor 36 for detecting the intake pressure of the engine 11 is provided in the intake passage 32. Fuel injection valves 37 for injecting fuel into the intake ports 17 are provided at a downstream end of the intake passage 32. Each injection valve 37 injects fuel into the corresponding intake port 17 to form a mixture of fuel and air when air is drawn from the intake passage 32 into the corresponding combustion chamber 16 during the intake stroke of the engine 11.

The cylinder head 15 is also provided with ignition plugs 38 for igniting mixtures that are charged into the corresponding combustion chambers 16. When an air-fuel mixture burns in a combustion chamber 16 upon ignition, combustion energy causes the piston 12 to reciprocate so as to turn or rotate the crankshaft 14, thereby driving the engine 11. After the mixture burns in the combustion chamber 16, exhaust is discharged into the exhaust passage 33 with the piston 12 ascending during the exhaust stroke of the engine 11.

Next, a variable valve timing mechanism 24 for varying the open-close timing (valve timing) of the intake valves 19 of the engine 11 will be described with reference to FIG. 2.

Figure 2:
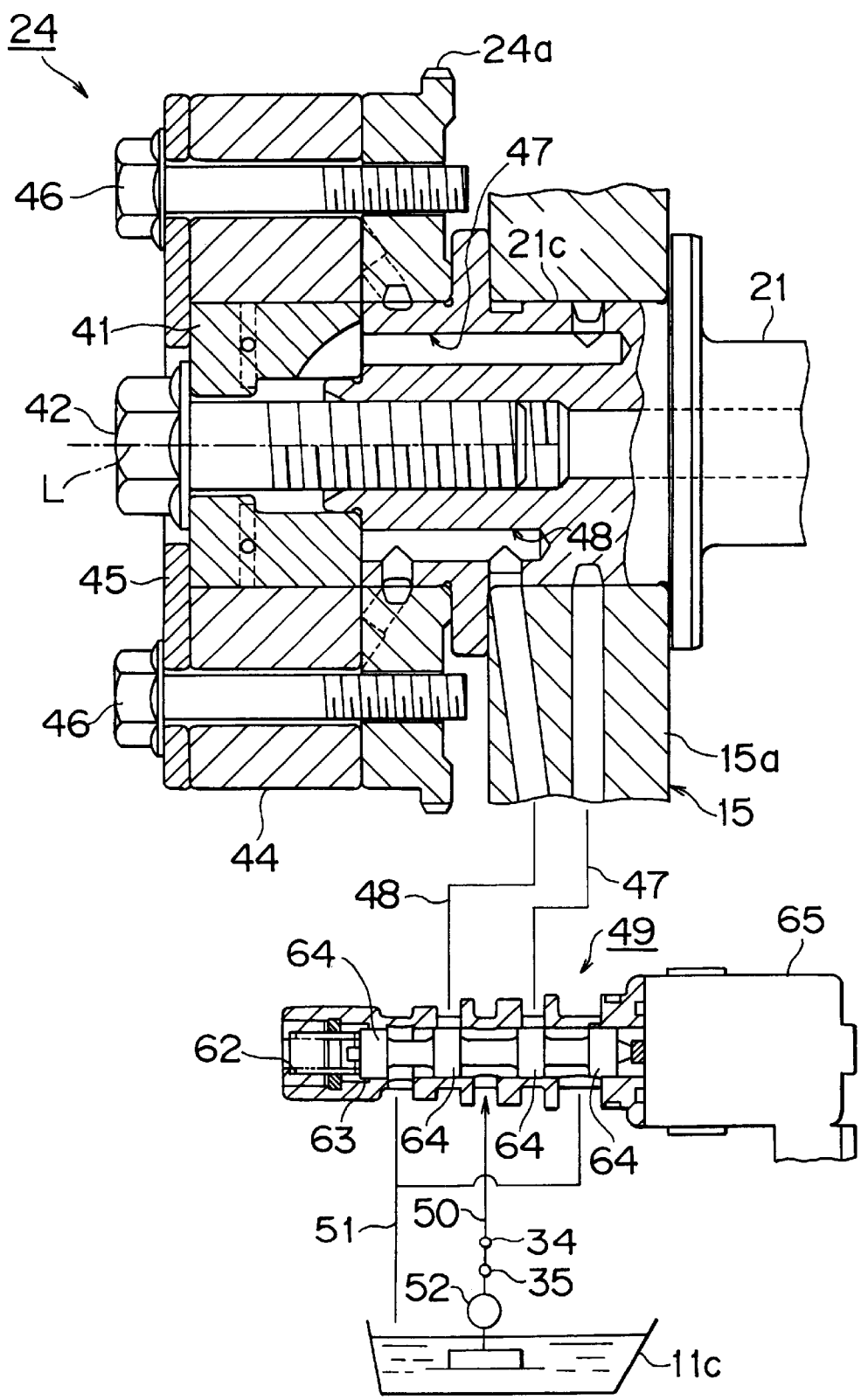
FIG. 2 is a cross-sectional view illustrating an arrangement for supplying hydraulic fluid to a variable valve timing mechanism.

As shown in FIG. 2, the intake camshaft 21 on which the variable valve timing mechanism 24 is mounted has a journal 21c that is rotatably supported by a bearing 15a of the cylinder head 15. The variable valve timing mechanism 24 includes a gear 24a to which rotary motion is transmitted from the crankshaft 14 via a chain or the like, and a rotating member (movable member) 41 that is fixed by a bolt 42 to an axial end face of the intake camshaft 21 (a left-side end face in FIG. 2). The gear 24a is rotatable relative to the intake camshaft 21 that extends through a central portion of the gear 24a.

A ring cover 44 abuts on the axial end face of the gear 24a such that the rotating member 41 is surrounded by the ring cover 44. A distal-end opening of the ring cover 44 is closed by a closure plate 45. The gear 24a, the ring cover 44 and the closure plate 45 are fixed with bolts 46 so that they are rotatable together. With this arrangement, the intake camshaft 21 and the rotating member 41 are rotatable together about an axis L of the intake camshaft 21. The gear 24a, the ring cover 44 and the closure plate 45 are rotatable about the axis L relative to the intake camshaft 21 and the rotating member 41.

The variable valve timing mechanism 24 is supplied with hydraulic fluid selectively from a timing advance-side oil passage (which will be simply called "advance-side oil passage") 47 and a timing retard-side oil passage (which will be simply called "retard-side oil passage") 48 that are formed in the bearing 15 and the intake camshaft 21 as shown in FIG. 2. When the variable valve timing mechanism 24 is operated with the hydraulic fluid supplied in this manner, the relative rotational phase of the intake camshaft 21 with respect to the crankshaft 14 is advanced or retarded, so that the valve timing of the intake valves 19 is changed.

An oil control valve (OCV) 49 is connected to the advance-side oil passage 47 and to the retard-side oil passage 48. A supply passage 50 and a discharge passage 51 are connected to the OCV 49. The supply passage 50 connects with an oil pan 11c provided in a lower portion of the engine 11, via an oil pump 52 that is driven as the crankshaft 14 rotates. The discharge passage 51 directly connects with the oil pan 11c.

The OCV 49 has a spool 63 that has four valve portions 64 and that is urged in one direction by a coil spring 62 and in the opposite direction by an electromagnetic solenoid 65. While the electromagnetic solenoid 65 is held in a de-energized state, the spool 63 is positioned at one axial end (the right-hand side in FIG. 2) under the bias force of the coil spring 62, so that the advance-side oil passage 47 and the supply passage 50 communicate with each other and the retard-side oil passage 48 and the discharge passage 51 communicate with each other. In this state, hydraulic fluid is delivered from the oil pan 11c into the advance-side oil passage 47 by the oil pump 52, and hydraulic fluid is returned from the retard-side oil passage 48 to the oil pan 11c.

When the electromagnetic solenoid 65 is energized, the coil spring 62 is positioned at the opposite axial end (the left-hand side in FIG. 2) against the bias force of the coil spring 62, so that the advance-side oil passage 47 and the discharge passage 51 communicate with each other and the retard-side oil passage 48 and the supply passage 50 communicate with each other. In this state, hydraulic fluid is delivered from the oil pan 11c into the retard-side oil passage 48 by the oil pump 52, and hydraulic fluid is returned from the advance-side oil passage 47 to the oil pan 11c.

The pressure (hydraulic pressure) of hydraulic fluid flowing in the supply passage 50 is detected by an oil pressure sensor 34, and the temperature thereof is detected by an oil temperature sensor 35.

The constructions of the rotating member 41 and the ring cover 44 of the variable valve timing mechanism 24 will next be described in detail with reference to FIG. 3.

Figure 3:
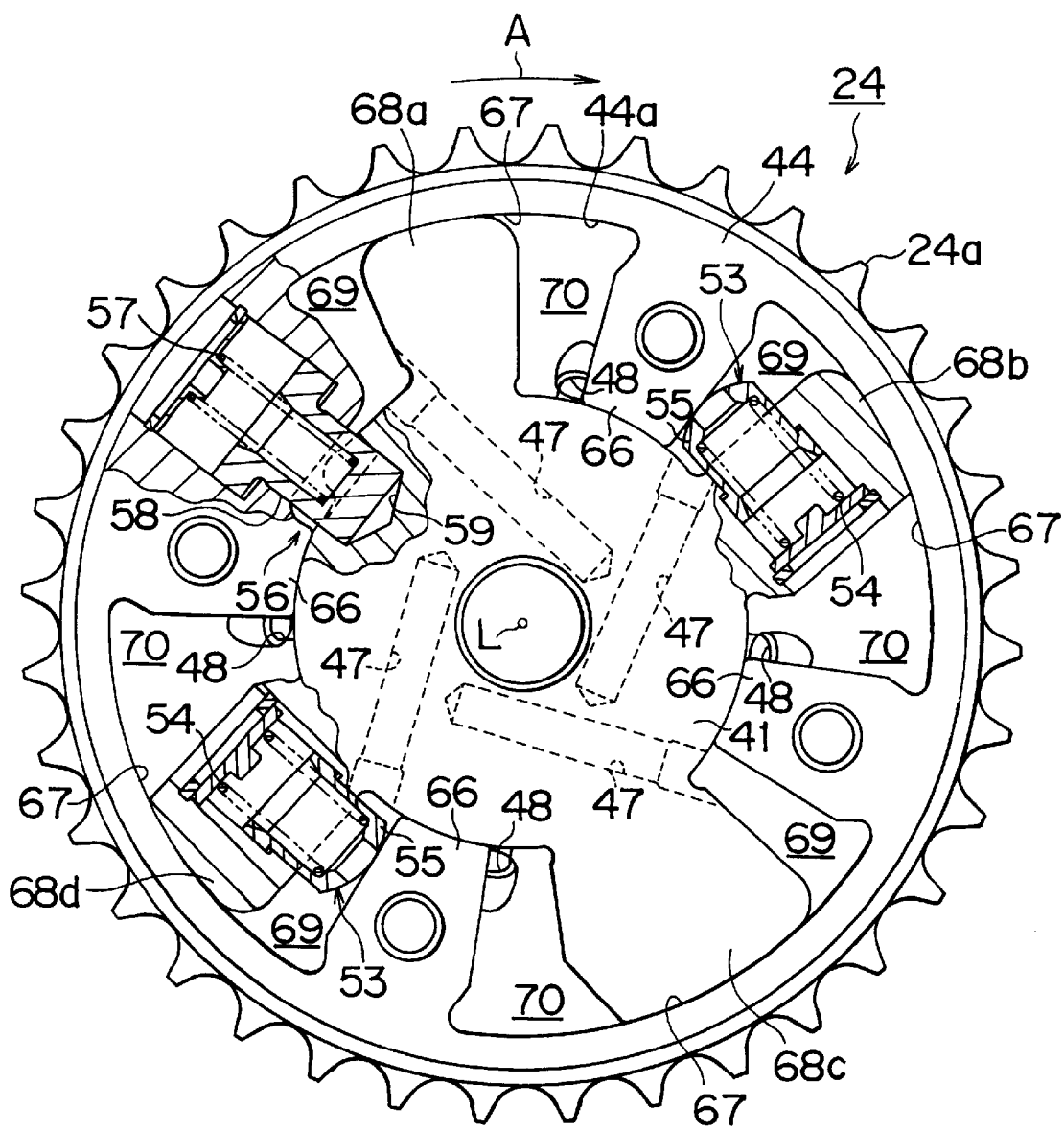
FIG. 3 is a cross-sectional view showing the internal structure of the variable valve timing mechanism.

As shown in FIG. 3, the ring cover 44 has four projections 66 that protrude from an inner circumferential surface 44a of the ring cover 44 toward the axis L of the intake camshaft 21 (FIG. 2). The projections 66 are formed at predetermined intervals as viewed in the circumferential direction of the ring cover 44. Also, recesses 67 are formed between the projections 66 at predetermined intervals as viewed in the circumferential direction of the ring cover 44. The rotating member 41 has four vanes 68a–68d that protrude outwardly from an outer circumferential surface of the member 41 in such a manner that the vanes 68a–68d are inserted into the respective recesses 67. Each of the recesses 67 receiving the vanes 68a–68d is divided by the corresponding vane into a timing advance-side hydraulic chamber (hereinafter simply called "advance-side hydraulic chamber") 69 and a timing retard-side hydraulic chamber (hereinafter simply called "retard-side hydraulic chamber") 70. The advance-side hydraulic chamber 69 and the retard-side hydraulic chamber 70 are positioned so as to interpose the corresponding vane 68a–68d therebetween as viewed in the direction of the circumference of the rotating member 41. Each advance-side hydraulic chamber 69 communicates with the advance-side oil passage 47 extending through the rotating member 41. Each retard-side hydraulic chamber 70 communicates with the retard-side oil passage 48 extending through the gear 24a.

In the variable valve timing mechanism 24 as described above, when the electromagnetic solenoid 65 of the OCV 49 is de-energized, hydraulic fluid is supplied from the advance-side oil passage 47 to the advance-side hydraulic chambers 69 while at the same time hydraulic fluid is discharged from the retard-side hydraulic chambers 70 via the retard-side oil passage 48. As a result, the vanes 68a–68d are moved in a direction indicated by an arrow "A" in FIG. 3, and therefore the rotating member 41 turns clockwise in FIG. 2 relative to the ring cover 44. As a result, the relative rotational phase of the intake camshaft 21 with respect to the gear 24a (crankshaft 14) is changed. In the variable valve timing mechanism 24 of this embodiment, when rotation of the crankshaft 14 is transmitted to the gear 24a via a chain and the like, the gear 24a and the intake camshaft 21 rotate clockwise in FIG. 2. Therefore, the relative movements of the vanes 68a–68d in the direction of the arrow "A" cause the angular position (or phase) of the intake camshaft 21 to be ahead of that of the crankshaft 14, and thus advance the valve timing of the intake valves 19.

When the electromagnetic solenoid 65 of the OCV 49 is energized, hydraulic fluid is supplied from the retard-side oil passage 48 into the retard-side hydraulic chambers 70 and concurrently hydraulic fluid is discharged from the advance-side hydraulic chambers 69 via the advance-side oil passage 47. As a result, the vanes 68a–68d are moved in a direction opposite to the direction of the arrow "A", so that the rotating member 41 turns counterclockwise in FIG. 3 relative to the ring cover 44. As a result, the relative rotational phase of the intake camshaft 21 with respect to the gear 24a (crankshaft 14) is changed in a direction opposite to the aforementioned direction. In this case, the angular position of the intake camshaft 21 comes behind that of the crankshaft 14, and the valve timing of the intake valves 19 is retarded.

By controlling the supply of hydraulic fluid to the advance-side hydraulic chambers 69 and the retard-side hydraulic chambers 70 through duty control of voltage applied to the electromagnetic solenoid 65, the valve timing of the intake valves 19 can be changed, or can be maintained in a certain state.

Next, there will be described an arrangement for fixing the valve timing of the intake valves 19 in a predetermined state between the most retarded state and the most advanced state at the time of the start of the engine 11, for example. The control range of the valve timing of the intake valves 19 is established so that valve timing suitable for the start of the engine (which will be called "engine start valve timing") can be obtained when the valve timing reaches the aforementioned predetermined state.

Of the four vanes 68a–68d of the rotating member 41, two vanes 68b, 68d positioned symmetrically about the axis L are provided with thrust mechanisms 53 as shown in FIG. 3. The thrust mechanisms 53 are provided for, when the valve timing of the intake valves 19 is retarded with respect to the predetermined state, urging the intake camshaft 21 (rotating member 41) toward the advance side so that the valve timing reaches the predetermined state.

Each thrust mechanism 53 includes a push pin 55 that is urged by a coil spring 54 to protrude into the corresponding advance-side hydraulic chamber 69. The coil spring 54 can expand and contract in the circumferential direction. When the engine 11 is stopped, a distal end of the push pin 55 abuts on an inner wall of the corresponding advance-side hydraulic chamber 69, and, owing to the bias force of the coil springs 54, the rotating member 41 is brought into a position that is advanced (in the direction of the arrow "A" in FIG. 3) by a predetermined amount from the most retarded state. With the rotating member 41 held in this position, the valve timing of the intake valves 19 provides the engine start valve timing. Accordingly, the retard-side limit of the control range of the valve timing of the intake valves 19 is set to be further on the retard side of the engine start valve timing. Thus, the control range of the valve timing of the intake valves 19 is broadened, whereby the valve timing of the intake valves 19 can be optimally controlled over the entire operating region of the engine 11.

Furthermore, the variable valve timing mechanism 24 includes a stopper mechanism 56 disposed at one of the projections 66 of the ring cover 44. The stopper mechanism 56 is provided for fixing the valve timing of the intake valves 19 to the engine start valve timing.

The stopper mechanism 56 includes a stopper pin 58 provided in the projection 66 of the ring cover 44, and a hole 59 formed in the rotating member 41. The stopper pin 58 is urged toward the axis L by a coil spring 57, and the hole 59 is configured to receive a distal end of the stopper pin 58. When the engine 11 is stopped, and the valve timing of the intake valves 19 is set to the engine start valve timing under the bias force of the thrust mechanisms 53, the distal end of the stopper pin 58 is inserted into the hole 59 due to the bias force of the coil spring 57. In this state, the relative rotational phase of the intake camshaft 21 with respect to the crankshaft 14 is fixed, and the valve timing of the intake valves 19 is fixed to the engine start valve timing.

Also, hydraulic fluid is supplied from the advance-side hydraulic chamber 69 and the retard-side hydraulic chamber 70 to the stopper mechanism 56. Due to the pressure of hydraulic fluid supplied to the stopper mechanism 56, the stopper pin 58 is retracted to be out of the hole 59 against the bias force of the coil spring 57, whereby the valve timing ceases to be fixed by the stopper mechanism 56. While the engine 11 is being operated, hydraulic fluid is supplied from at least one of the advance-side hydraulic chamber 69 and the retard-side hydraulic chamber 70 to the stopper mechanism 56, so that the stopper pin 58 is maintained in the retracted position.

Figure 4:
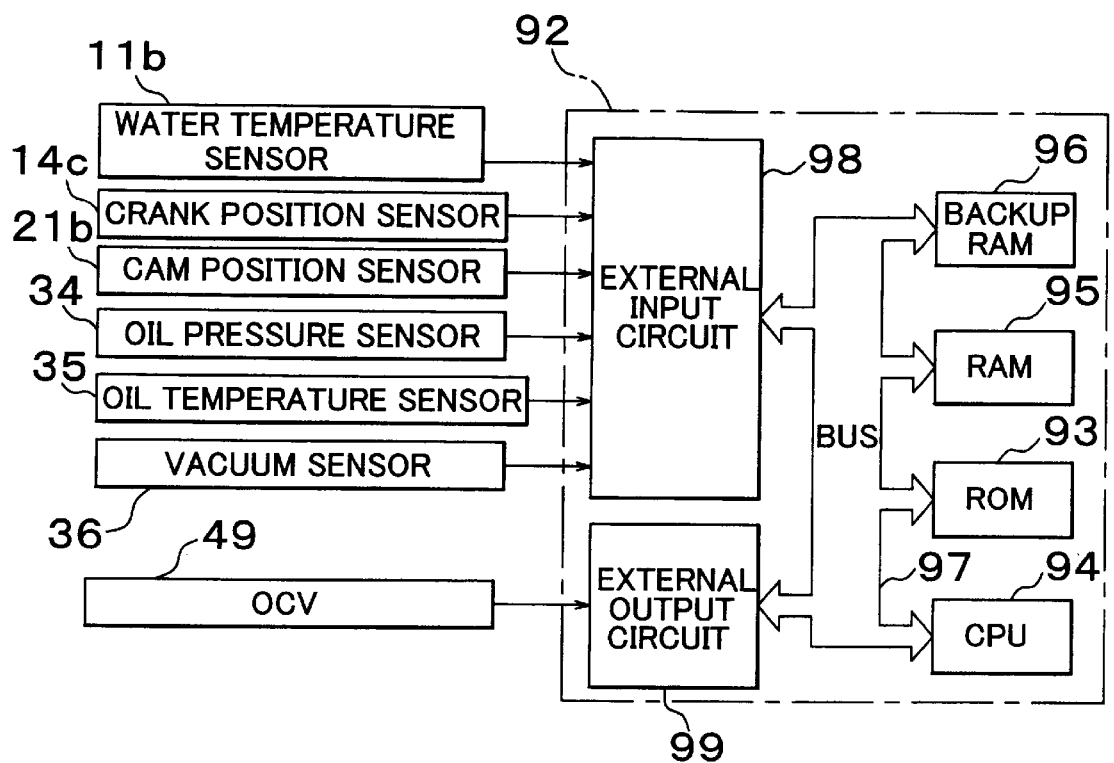
FIG. 4 is a block diagram illustrating an electrical arrangement of the valve timing control apparatus.

An electrical arrangement of the valve timing control apparatus of this embodiment will next be described with reference to FIG. 4.

The valve timing control apparatus has an electronic control unit (hereinafter referred to as "ECU") 92 for controlling the operating state of the engine 11. The ECU 92 is formed as an arithmetic logic unit including a ROM 93, a CPU 94, a RAM 95, a backup RAM 96, etc.

The ROM 93 stores various control programs, maps that are referred to during execution of the control programs, and so forth. The CPU 94 performs computing or calculations according to the control programs and maps stored in the ROM 93. The RAM 95 temporarily stores results of operations performed by the CPU 94, data received from various sensors, etc. The backup RAM 96 is a nonvolatile memory that retains the stored data and other data while the engine 11 is stopped. The ROM 93, the CPU 94, the RAM 95 and the backup RAM 96 are connected to one another and to an external input circuit (interface) 98 and to an external output circuit (interface) 99 via a bus 97.

To the external input circuit 98 are connected the water temperature sensor 11b, the crank position sensor 14c, the cam position sensor 21b, the oil pressure sensor 34, the oil temperature sensor 35, the vacuum sensor 36, etc. The OCV 49 and other controlled components that do not relate to the invention (and therefore are not further discussed herein) are connected to the external output circuit 99.

The ECU 92 constructed as described above controls the valve timing of the intake valves 19, by performing duty control of voltage applied to the electromagnetic solenoid 65 of the OCV 49 with a duty ratio D established depending upon the operating state of the engine 11. In such valve timing control, the advance amount of the valve timing of the intake valve 19 is controlled. The advance amount is equivalent to a value that indicates how much the valve timing is advanced with respect to the most retarded state as a reference position.

The valve timing of the intake valve 19 is normally held in a predetermined state when the duty ratio D is "50%". This is because when the duty ratio D becomes equal to "50%", the supply and discharge of hydraulic fluid to and from the advance-side hydraulic chambers 69 and the retard-side hydraulic chambers 70 are inhibited by the OCV 49.

When the duty ratio D becomes greater than "50%", the rate of change of the valve timing toward the retard side gradually increases as the duty ratio D becomes closer to "100%". This is because the amount of hydraulic fluid supplied to the retard-side hydraulic chambers 70 increases as the duty ratio D becomes closer to "100%". Similarly, when the duty ratio D becomes less than "50%", the rate of change of the valve timing toward the advanced side gradually increases as the duty ratio D becomes closer to "0%". This is because as the duty ratio D becomes closer to "0%", the amount of hydraulic fluid supplied to the advance-side hydraulic chambers 69 increases.

The duty ratio D used in the valve timing control of the intake valves 19 is calculated according to the equation (1) as follows, using a control gain P and a holding duty ratio H.

$$D=P+H \qquad (1)$$

In the above equation (1), the control gain P is a value that is increased or decreased so that the actual valve timing of the intake valves 19 approaches a target value that is set in accordance with the operating state of the engine 11.

To calculate the control gain P, the ECU 92 determines an actual advance amount in the valve timing of the intake valves 19 based on detection signals from the crank position sensor 14c and the cam position sensor 21b, and calculates a target value of the advance amount based on the operating state of the engine 11. Then, the ECU 92 calculates a control gain P from a map or the like, based on a difference between the actual advance amount and the target value, and others. In this manner, the control gain P is increased or decreased so that the actual advance amount approaches the target value when the OCV 49 is controlled based on the duty ratio D. The amount of increase/decrease in the control gain P increases with an increase in the difference between the actual advance amount and the target value, and is related to the characteristic of the rate of change of the valve timing of the intake valves 19. Namely, the rate of change of the valve timing for rendering the actual advance amount close to the target value increases with an increase in the amount of increase/decrease of the control gain P.

In the above equation (1), the holding duty ratio H, stored as hold data, is equivalent to a duty ratio D at which the difference between the actual valve timing (advance amount) of the intake valves 19 and the target value of the valve timing (target advance amount) is kept less than a predetermined value. Although the hold data (holding duty ratio) thus stored should be "50%", it is usually the case that the hold data is slightly greater or smaller than "50%" due to variations among individual products of the variable valve timing mechanism 24, for example.

When the duty ratio D is increased or decreased in accordance with an increase/decrease in the control gain P so as to bring the actual advance amount closer to the target value, the holding duty ratio H serves as a reference value (or a center) with respect to which the duty ratio D is increased or decreased. Namely, the duty ratio D is increased or decreased with reference to the holding duty ratio H serving as the center so that the actual advance amount approaches the target value.

It is to be noted herein that when the valve timing of the intake valves 19 is on the retard side of the engine start valve timing, the urging or bias force exerted by the thrust mechanisms 53 acts on the intake camshaft 21 (rotating member 41) in the direction of timing advance. The bias force due to the thrust mechanisms 53 gradually increases as the valve timing is further retarded, namely, as the rotating member 41 shifts to the more retarded position (in the direction opposite to the arrow "A" in FIG. 3). If the valve timing is controlled while the bias force of the thrust mechanisms 53 is acting on the rotating member 41, the valve timing control is adversely affected by the bias force, which increases with a degree of change of the valve timing toward the most retarded position.

More specifically, the characteristic of the rate of change in the valve timing while the actual advance amount is made equal to the target value differs depending upon whether the valve timing of the intake valves 19 is on the advance side or on the retard side with respect to the engine start valve timing, i.e., depending upon the presence or absence of the bias force of the thrust mechanisms 53, even where the control gain P is the same. Therefore, when the valve timing changes from the advance side of the engine start valve timing (i.e., a range that is not affected by the above-mentioned bias force) to the retard side of the engine start valve timing (i.e., a range affected by the bias force), for example, the valve timing may be changed at varying rates in an inappropriate manner so as to bring the actual advance amount closer to the target value. Consequently, the valve timing may not be properly controlled.

The holding duty ratio H assumes a value that is influenced by the bias force of the thrust mechanisms 53 when the valve timing is on the retard side of the engine start valve timing. When the valve timing is on the advance side of the engine start valve timing, the holding duty ratio H assumes a value that is not influenced by the bias force. Therefore, when the valve timing changes from the advance side of the engine start valve timing (i.e., the range that is not affected by the bias force) to the retard side of the engine start valve timing (i.e., the range affected by the bias force), for example, the center (reference value) with respect to which the duty ratio D is increased or decreased so as to bring the actual advance amount closer to the target value may deviate from an appropriate one since the holding duty ratio H does not take account of the addition of the bias force. Consequently, the valve timing may not be properly controlled.

In this embodiment, therefore, the bias force of the thrust mechanisms 53 is taken into consideration when the control gain P and the holding duty ratio H are calculated.

The control gain P, when calculated based on the difference between the actual advance amount and the target value, is determined taking account of the bias force of the thrust mechanism 53. When the valve timing is on the retard side of the engine start valve timing, the value of the control gain P differs from a normal value that is obtained in the absence of the bias force of the thrust mechanism 53. That is, when the valve timing of the intake valves 19 is currently on the retard side of the engine start valve timing and is changed in the retarding direction so as to bring the actual advance amount closer to the target value, the control gain P is set to a value between "0%" and "50%" in accordance with the aforementioned difference and other parameters to be discussed below. The control gain P thus set within the range of "0%" to "50%" is calculated in view of the influence by the above-described bias force, to be relatively close to "50%" as compared with the case where the valve timing that is currently on the advance side of the engine start valve timing is being retarded. When the valve timing of the intake valves 19 that is currently on the retard side of the engine start valve timing is being changed in the advancing direction so as to bring the actual advance amount closer to the target value, the control gain P is set to a value between "−50%" and "0%" in accordance with the aforementioned difference and other parameters. The control gain P thus set within the range of "−50%O" to "0%" is calculated in view of the influence by the above-described bias force, to be relatively close to "0%" as compared with the case where the valve timing that is currently on the advance side of the engine start valve timing is being advanced.

As for the holding duty ratio H, when a duty ratio D is stored as hold data while the valve timing is on the retard side of the engine start valve timing, the hold data assumes a value that deviates from the actual duty ratio D in the advancing direction (i.e., toward "0%") by a degree that increases as the advance amount becomes closer to 0 (i.e., as the intake camshaft 21 approaches the most retarded position). Furthermore, when the stored hold data is used as the holding duty ratio H while the valve timing is on the retard side of the engine start valve timing, the holding duty ratio H assumes a value that deviates from the actual hold data D in the retarding direction (i.e., toward "100%") by a degree that increases as the advance amount becomes closer to 0 (i.e., as the intake camshaft 21 approaches the most retarded position). In this manner, the holding duty ratio H is determined, taking account of the bias force of the thrust mechanisms 53.

Since the control gain P and the holding duty ratio H are determined taking account of the bias force of the thrust mechanisms 53, the duty ratio D calculated from the control gain P and the holding duty ratio H is also determined taking account of the above-indicated bias force. Based on the thus-determined duty ratio D, the OCV 49 is driven so as to control the valve timing of the intake valves 19. Accordingly, the valve timing can be precisely controlled without being adversely influenced by the bias force of the thrust mechanisms 53.

Figure 6:
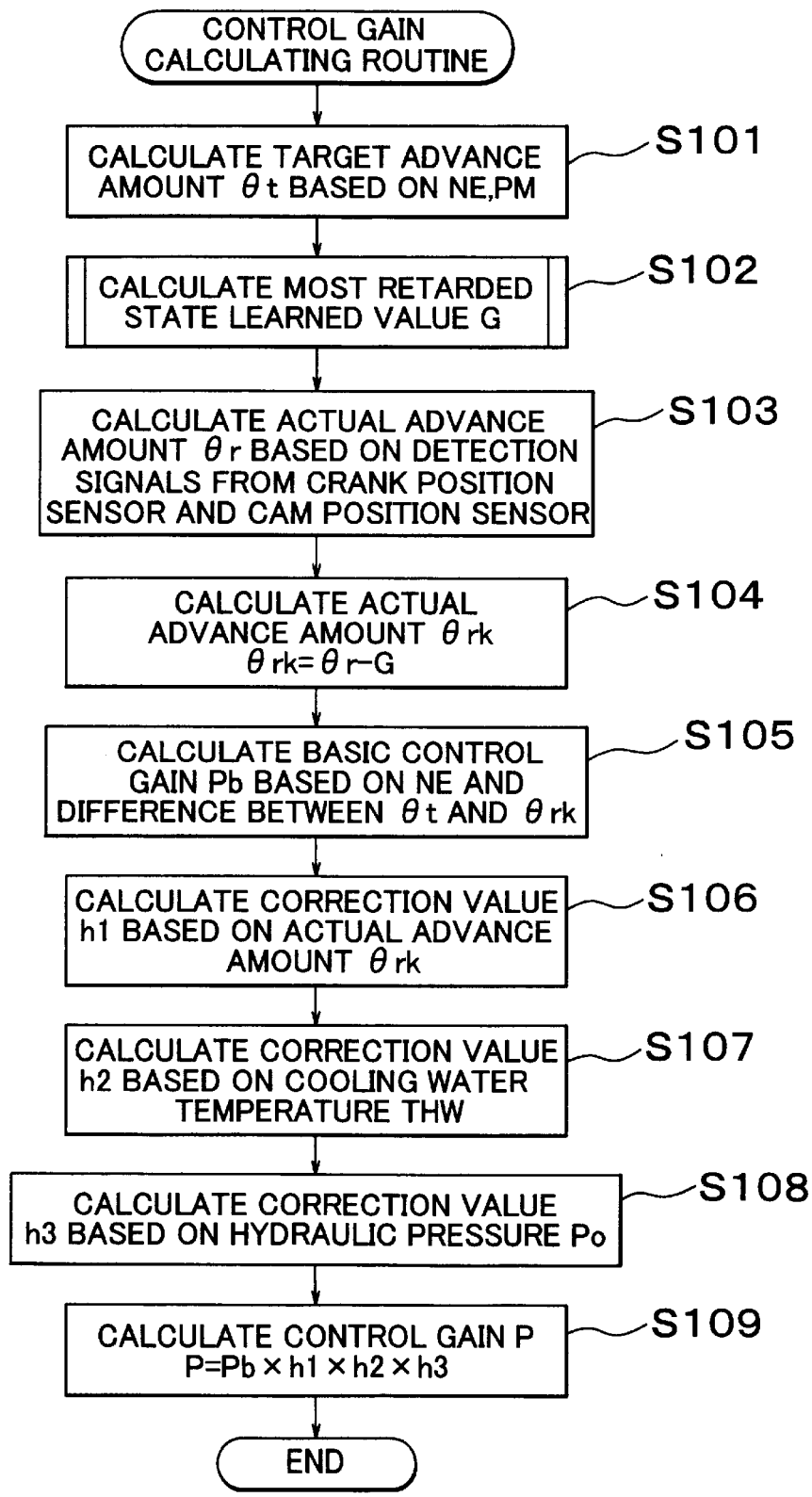
FIG. 6 is a flowchart illustrating a control gain calculating routine.

A procedure of calculating the control gain P will next be described with reference to FIG. 6. FIG. 6 is a flowchart illustrating a control gain calculating routine for calculating a control gain P. The control gain calculating routine as an interrupt routine is executed by the ECU 92 at predetermined time intervals.

In the control gain calculating routine, the control gain P is calculated in step S109 according to the following equation (2), using a basic control gain Pb and correction values h1–h3 which will be described below.

$$P = Pb \times h1 \times h2 \times h3 \qquad (2)$$

In the above equation (2), the basic control gain Pb is a value that is increased or decreased so that the difference between the actual advance amount in the valve timing of the intake valves 19 and the target value of the advance amount becomes less than a predetermined value. The basic control gain Pb is calculated or obtained from a map or the like, using the difference between the actual advance amount and the target value, and the engine speed NE determined based on a detection signal from the crank position sensor 14c. The correction values h1–h3 are determined based on various parameters that affect the characteristic of the rate of change in the valve timing during the valve timing control for bringing the actual advance amount closer to the target value.

The control gain P is determined by multiplying the basic control gain Pb by the correction values h1–h3. Therefore, by driving the OCV 49 in a controlled manner with the duty ratio D calculated from the control gain P, it is possible to optimize the characteristic of the rate of change of the valve timing during valve timing control for bringing the actual advance amount closer to the target value, independently of the aforementioned various parameters.

The processes of steps S101 to S105 in the control gain calculating routine are intended for calculating the basic control gain Pb. In step S101, the ECU 92 calculates a target advance amount θt (target value of advance amount) based on the engine speed NE and an intake pressure PM determined from a detection signal of the vacuum sensor 36.

Subsequently in step S102, the ECU 92 calculates a most retarded state learned value G. In step 103, the ECU 92 calculates an actual advance amount θr based on the detection signals from the crank position sensor 14c and the cam position sensor 21b. The actual advance amount θr is determined on the basis of the most retarded state of the valve timing of the intake valves 19 (serving as a reference position ("0")), and this amount θr increases as the valve timing is advanced.

The most retarded state of the valve timing varies among individual variable valve timing mechanisms 24 due to, for example, product errors. Because of such variations, the most retarded state of the valve timing may deviate by a great degree from an appropriate state. If the deviation is excessively large, the actual advance amount θr may falsely represent the advance amount in the valve timing as measured from the most retarded state. If the valve timing control is performed based on the actual advance amount θr thus determined, the resulting valve timing becomes inappropriate.

To avoid the above problem, the valve timing control is performed using an actual advance amount θrk (actual advance amount) that is obtained by subtracting the most retarded state learned value G from the actual advance amount θr in step S104. That is, the most retarded state learned value G is a value obtained in the operation of step S102, as a learned value of a deviation of the most retarded state of the valve timing from its appropriate state. Thus, the aforementioned problem may be avoided by performing the valve timing control using the actual advance amount θrk that has been determined in view of the most retarded state learned value G.

In step S105, the ECU 92 calculates a basic control gain Pb based on the difference between the target advance amount θt and the actual advance amount θrk and the engine speed NE. The basic control gain Pb thus calculated is adapted to cause the valve timing to change more rapidly as the difference between the target advance amount θt and the actual advance amount θrk increases, and to cause the valve timing to change more slowly as the engine speed NE increases. This is because when the engine speed NE becomes high, the amount of oil delivered from the oil pump 52 that is driven with rotation of the crankshaft 14 increases, and the rate of change of the valve timing increases accordingly when the above-indicated difference is constant.

Thus, the engine speed NE is a parameter that affects the state of hydraulic fluid (hydraulic pressure) that actuates the variable valve timing mechanism 24, and the rate of change of the valve timing. The basic control gain Pb (control gain P) is changed in accordance with this parameter, as well as the difference between the target advance amount θt and the actual advance amount θrk.

Figure 5:
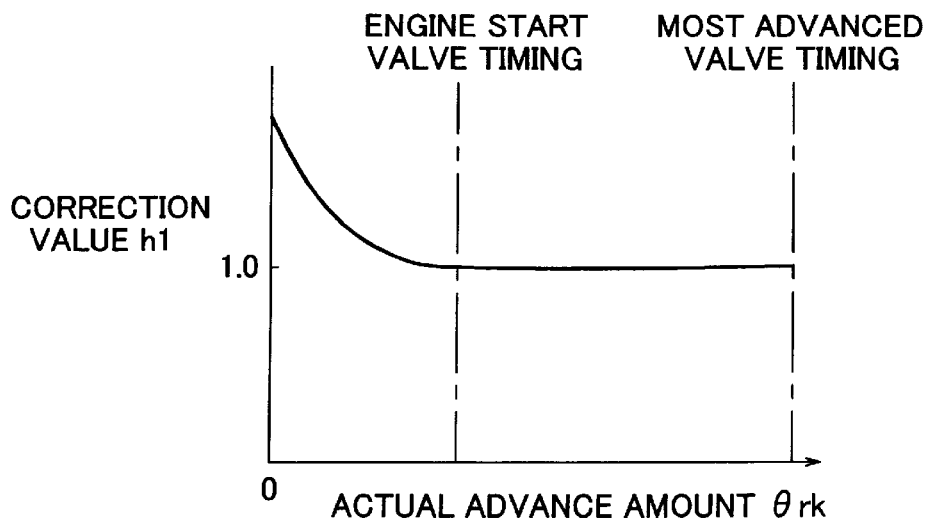
FIG. 5 is a graph indicating the relationship between a correction value h1 and an actual advance amount $\theta rk$.

In the control gain calculating routine, the process of steps S106 to S108 is intended for calculating correction values h1–h3. In step S106, the ECU 92 calculates a correction value h1 based on the actual advance amount θrk. The correction value h1 changes with respect to changes in the actual advance amount θrk as indicated in FIG. 5. More specifically, the correction value h1 is equal to "1.0", which is a reference value, over a range of the actual advance amount θrk between a value corresponding to the most advanced state of the valve timing and a value corresponding to the engine start valve timing. As the actual advance amount θrk changes from the value corresponding to the engine start valve timing toward "0" (the most retarded position), the correction value h1 gradually changes, i.e., increases to be greater than "1.0".

When the valve timing is retarded so as to bring the actual advance amount θrk closer to the target advance amount θt, the bias force of the thrust mechanisms 53 gradually increases as the valve timing is retarded from a point at which the valve timing is equal to the engine start valve timing to a point at which the valve timing reaches the most retarded state. In this case, the correction value h1 gradually increases from "1.0" to greater values. Thus, the basic control gain Pb is multiplied by the correction value h1, so that the control gain P in the range of "0%" to "50%" is corrected to a value that is closer to "50%". Consequently, the rate of change of the valve timing in the retarding direction is prevented from being excessively reduced by the bias force of the thrust mechanisms 53.

When the valve timing is advanced so as to bring the actual advance amount θrk closer to the target advance amount θt, the valve timing is biased toward the advance side under the biasing force of the thrust mechanisms 53 until the valve timing reaches the engine start valve timing from the most retarded state. The bias force of the thrust mechanisms 53 gradually decreases as the valve timing advances. In this case, the correction value h1 gradually changes from a value greater than "1.0" toward "1.0". Thus, the basic control gain Pb is multiplied by the correction value h1, so that the control gain P in the range of "–50%" to "0%" is corrected to a value that is closer to "0%". Consequently, the rate of change of the valve timing in the advancing direction is prevented from being excessively increased by the bias force of the thrust mechanisms 53.

As described above, the control gain P is corrected in accordance with the above-indicated bias force, by multiplying the basic control gain Pb by the correction value h1 that changes in accordance with the actual advance amount θrk. Thus, the control gain P is determined taking account of the bias force of the thrust mechanisms 53. Then, the OCV 49 is driven under control with the duty ratio D determined from the control gain P, so that the valve timing changes at appropriately controlled rates during control for bringing the actual advance amount θrk closer to the target advance amount θt, regardless of the bias force of the thrust mechanisms 53. As a result, the valve timing of the intake valves 19 can be precisely or appropriately controlled even when the bias force of the thrust mechanisms 53 acts on the intake camshaft 21 (rotating member 41).

Subsequently in step S107, the ECU 92 calculates a correction value h2 based on the cooling water temperature THW of the engine 11 obtained from a detection signal from the water temperature sensor 11b. In step S108, the ECU 92 calculates a correction value h3 based on the hydraulic pressure Po obtained from a detection signal from the oil pressure sensor 34. The correction values h2, h3 are intended for changing the control gain P in accordance with the cooling water temperature THW and the hydraulic pressure Po, respectively. By multiplying the basic control gain Pb by the correction values h2, h3, the control gain P is changed in accordance with the cooling water temperature THW and the hydraulic pressure Po.

The correction value h2 based on the cooling water temperature THW is determined with reference to a map(s) or the like, and becomes equal to a value (i.e., a value greater than "1.0") that increases the rate of change of the valve timing with an increase in the cooling water temperature THW. The reason for this control is as follows: as the cooling water temperature THW (engine temperature) rises, the viscosity of hydraulic fluid decreases and the amount of leakage of hydraulic fluid increases. When the cooling water temperature THW is high, therefore, the hydraulic pressures in the hydraulic chambers 69, 70 are reduced, resulting in a reduction in the rate of change of the valve timing. In this connection, a plurality of maps corresponding to a plurality of types of hydraulic fluids with different viscosities may be prepared for determining the correction value h2 as described above. In this case, a suitable map is selected depending upon the type of hydraulic fluid used in the system. On the other hand, the correction value h3 based on the hydraulic pressure Po becomes equal to a value (i.e., a value close to "1.0") that decreases the rate of change of the valve timing with an increase in the hydraulic pressure Po. This is because the rate of change of the valve timing is normally increased as the hydraulic pressure Po increases.

The various values of h1–h3 can be determined empirically in advance and then stored as tables or maps in memory. Then, during execution of the FIG. 6 flowchart, the appropriate values for h1, h2 and h3 are selected based upon θrk, THW and Po, respectively.

The correction values h1–h3 determined in steps S106 to S108 are used to calculate a control gain P in step S109. After calculating the control gain P, the ECU 92 temporarily ends the control gain calculating routine.

Figure 7:
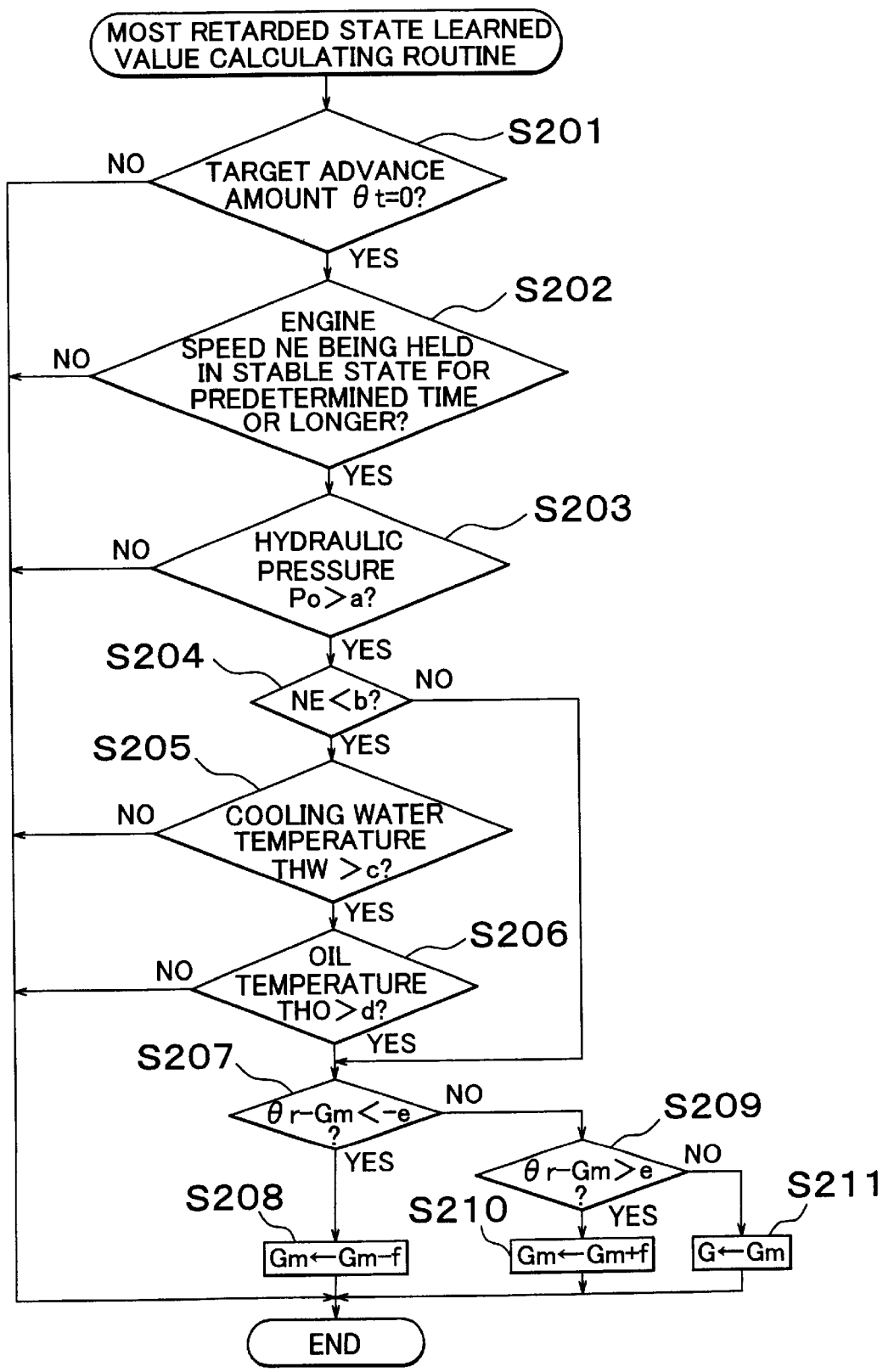
FIG. 7 is a flowchart illustrating a most retarded state learned value calculating routine.

The operation of step S102 in the control gain calculating routine will next be described in detail with reference to FIG. 7. FIG. 7 is a flowchart illustrating a most retarded state learned value calculating routine for calculating a most retarded state learned value G. The most retarded state learned value calculating routine is executed by the ECU 92 every time the control flow goes to step S102 in the control gain calculating routine of FIG. 6.

In steps S207 to S211 of the most retarded state learned value calculating routine, the ECU 92 learns (stores) a deviation of the actual advance amount θr measured when the target advance amount θt is set to "0 (corresponding to the most retarded position)" from an appropriate value of the actual advance amount θr, as a most retarded state learned value G. Based on the thus obtained most retarded state learned value G and the actual advance amount θr, the ECU 92 calculates an actual advance amount θrk by taking account of the most retarded state learned value G in step S104. By using the actual advance amount θrk in place of the actual advance amount θr for the calculation of the control gain P, the valve timing control using the control gain P (duty ratio D) can be appropriately performed even if the most retarded state of the valve timing deviates excessively from the appropriate state due to product errors or the like.

It is, however, to be noted that during learning of the most retarded state learned value G with the target advance amount θt being set to "0 (most retarded)", the bias force of the thrust mechanisms 53 acts on the intake camshaft 21 when the valve timing is controlled to the most retarded state, which may result in incorrect or false learning of the most retarded state learned value G due to the influence of the bias force. That is, if the most retarded state learning is performed in a situation where the valve timing cannot be retarded to the most retarded state against the above-indicated bias force, incorrect learning of the most retarded state learned value G takes place.

In this embodiment, therefore, when it is determined that the valve timing cannot be retarded to the most retarded state against the bias force of the thrust mechanisms 53, incorrect or false learning of the most retarded state learned value G is avoided by inhibiting learning of the most retarded state learned value G even where the target advance amount θt is set to "0". The operations of steps S203 to S206 of the most retarded state learned value calculating routine are performed in order to determine whether the valve timing can be retarded to the most retarded state against the bias force, and to control execution of the most retarded state learning based on the result of that determination. By controlling execution of the most retarded state learning while taking the bias force into consideration, the valve timing control can be performed in view of the bias force of the thrust mechanisms 53, whereby the valve timing can be appropriately controlled irrespective of the presence of the bias force.

In the most retarded state learned value calculating routine, the ECU 92 determines in step S201 whether the target advance amount θt is "0 (most retarded)". If a negative decision (NO) is obtained in step S201, namely, if θt is not equal to 0, the ECU 92 temporarily ends the most retarded state learned value calculating routine, and returns to the control gain calculating routine (FIG. 6). In this case, the most retarded state learned value G learned in the previous cycle is used to calculate an actual advance amount θrk in step S104 of FIG. 6.

If an affirmative decision (YES) is obtained in step S201, namely, if θt is equal to 0, the control flow goes to step S202. In step S202, the ECU 92 determines whether the engine speed NE has been held in a stable state for a predetermined period of time or longer. If a negative decision (NO) is obtained in step S202, the ECU 92 temporarily ends the most retarded state learned value calculating routine, and returns to the control gain calculating routine (FIG. 6). If an affirmative decision (YES) is obtained in step S202, the ECU 92 proceeds to step S203.

In step S203, the ECU 92 determines whether the hydraulic pressure Po is higher than a predetermined value "a", that is, whether the hydraulic pressure Po is higher than a value that allows the valve timing to be retarded to the most retarded state against the bias force of the thrust mechanisms 53. If it is determined that Po is equal to or lower than "a" ("NO" is obtained in step S203) and that the valve timing cannot be retarded to the most retarded state against the bias force, the ECU 92 temporarily ends the most retarded state learned value calculating routine, and returns to the control gain calculating routine (FIG. 6). In this case, therefore, learning of the most retarded state learned value G (steps S207 to S211) is skipped, thereby avoiding incorrect learning of the most retarded state learned value G that would otherwise occur if the most retarded state learned value G were learned in a condition where the hydraulic pressure Po is insufficient.

If it is determined in step S203 that Po is higher than "a" and that the current pressure of hydraulic fluid allows the valve timing to be retarded to the most retarded state against the bias force, the control flow goes to step S204. The operations of steps S204 to S206 are intended for double-checking whether the valve timing can be retarded to the most retarded state against the bias force. More specifically, step S204 is intended to determine whether the engine is in an operating state that allows learning of the most retarded state learned value G to be performed without executing subsequent steps S205, S206, namely, whether steps S205, 206 can be skipped or not. Steps S205, S206 are intended for determining whether the hydraulic fluid (or the engine) is in a state or condition that allows the valve timing to be retarded to the most retarded state against the bias force of the thrust mechanisms 53.

In step S204, the ECU 92 determines whether the engine speed NE is less than a predetermined value "b" (e.g., 700 rpm to 800 rpm). Subsequently in step S205, the ECU 92 determines whether the cooling water temperature THW is higher than a predetermined value "c". In step S206, the ECU 92 determines whether an oil temperature THO of hydraulic fluid obtained from a detection signal of the oil temperature sensor 35 is higher than a predetermined value "d". The predetermined values "c", "d" are respectively set to, for example, a cooling water temperature THW and an oil temperature THO that would appear immediately before the engine 11 becomes over-heated. If the cooling water temperature THW and the oil temperature THO are excessively high, the viscosity of hydraulic fluid decreases, thus making it difficult to establish a sufficiently high hydraulic pressure Po. In such a case, therefore, the valve timing may not be able to be retarded to the most retarded state against the bias force of the thrust mechanisms 53.

If step S204 determines that the engine speed NE is equal or greater than "b", it follows that the amount of oil delivered from the oil pump 52 is large enough to retard the valve timing to the most retarded state against the bias force irrespective of the cooling water temperature THW and the oil temperature THO. Therefore, if it is determined in step S204 that the engine speed NE is equal to or greater than "b", the ECU 92 skips steps S205, S206, and executes learning of the most retarded state learned value G (steps S207 to S211).

If step S204 determines that the engine speed NE is lower than "b", a reduced amount of oil is delivered from the oil pump 52, and it may not be possible to retard the valve timing to the most retarded state against the bias force, depending upon the values of the cooling water temperature THW and the oil temperature THO. If it is determined in step S204 that NE is lower than "b", therefore, the ECU 92 sequentially performs the operations of steps S205, S206.

If step S205 determines that the cooling water temperature THW is higher than "c", the viscosity of hydraulic fluid is reduced due to an excessively high engine temperature, thus making it difficult to establish a sufficiently high hydraulic pressure Po. In this case, therefore, it is deemed impossible to retard the valve timing to the most retarded state against the bias force of the thrust mechanisms 53, and the ECU 92 temporarily ends the most retarded state learned value calculating routine without learning the most retarded state learned value G (steps S207 to S211). The ECU 92 then returns to the control gain calculating routine (FIG. 6).

If step S206 determines that the oil temperature THO is higher than "d", the viscosity of hydraulic fluid is reduced due to an excessively high oil temperature THO of hydraulic fluid, thus making it difficult to establish a sufficiently high hydraulic pressure Po. In this case, therefore, it is deemed impossible to retard the valve timing to the most retarded state against the bias force of the thrust mechanisms 53, and the ECU 92 temporarily ends the most retarded state learned value calculating routine without learning the most retarded state learned value G (steps S207 to S211). The ECU 92 then returns to the control gain calculating routine (FIG. 6).

If affirmative decisions (YES) are obtained in both steps S204 and S205, the ECU 92 executes learning of the most retarded state learned value G (steps S207 to S211). In steps S207 to S210, the ECU 92 subtracts a deviation Gm (which will be described below) from the actual advance amount $\theta r$ obtained when the valve timing is set to the most retarded state. The deviation Gm is then increased or decreased so that the value "$\theta r - Gm$" falls within a predetermined range (−e to e) that includes "0" that represents the appropriate value of the current actual advance amount $\theta r$. The deviation Gm that satisfies "−e <($\theta r - Gm$)<e" represents a deviation of the actual advance amount $\theta r$ appearing when the valve timing is in the most retarded state from the appropriate value "0". The deviation Gm that satisfies "−e <($\theta r - Gm$)<e" is learned (stored) as the most retarded state learned value G in step S211.

In step S207, the ECU 92 determines whether the value obtained by subtracting the deviation Gm from the actual advance amount $\theta r$ is less than "−e". The initial value of the deviation Gm may be, for example, "0". If ($\theta r - Gm$) is smaller than "−e", the ECU 92 executes step S208 to subtract a predetermined value "f" from the deviation Gm. Subsequently, the ECU 92 temporarily ends the most retarded state learned value calculating routine, and returns to the control gain calculating routine (FIG. 6). To the contrary, if ($\theta r - Gm$) is equal to or greater than "−e", the control flow goes to step S209.

In step S209, the ECU 92 determines whether the value obtained by subtracting the deviation Gm from the actual advance amount $\theta r$ is greater than "e". If ($\theta r - Gm$) is greater than "e", the ECU 92 executes step S210 to add the predetermined value "f" to the deviation Gm. Subsequently, the ECU 92 temporarily ends the most retarded state learned value calculating routine, and returns to the control gain calculating routine (FIG. 6). Conversely, if ($\theta r - Gm$) is equal to or smaller than "e", it is judged that "−e" <($\theta r - Gm$) <"e", and the control flow goes to step S211.

In step S211, the ECU 92 stores the deviation Gm as the most retarded state learned value G into the backup RAM 96. Subsequently, the ECU 92 temporarily ends the most retarded state learned value calculating routine, and returns to the control gain calculating routine (FIG. 6). The most retarded state learned value G thus obtained is used in step S104 of the control gain calculating routine to calculate an actual advance amount $\theta rk$.

Figure 8:
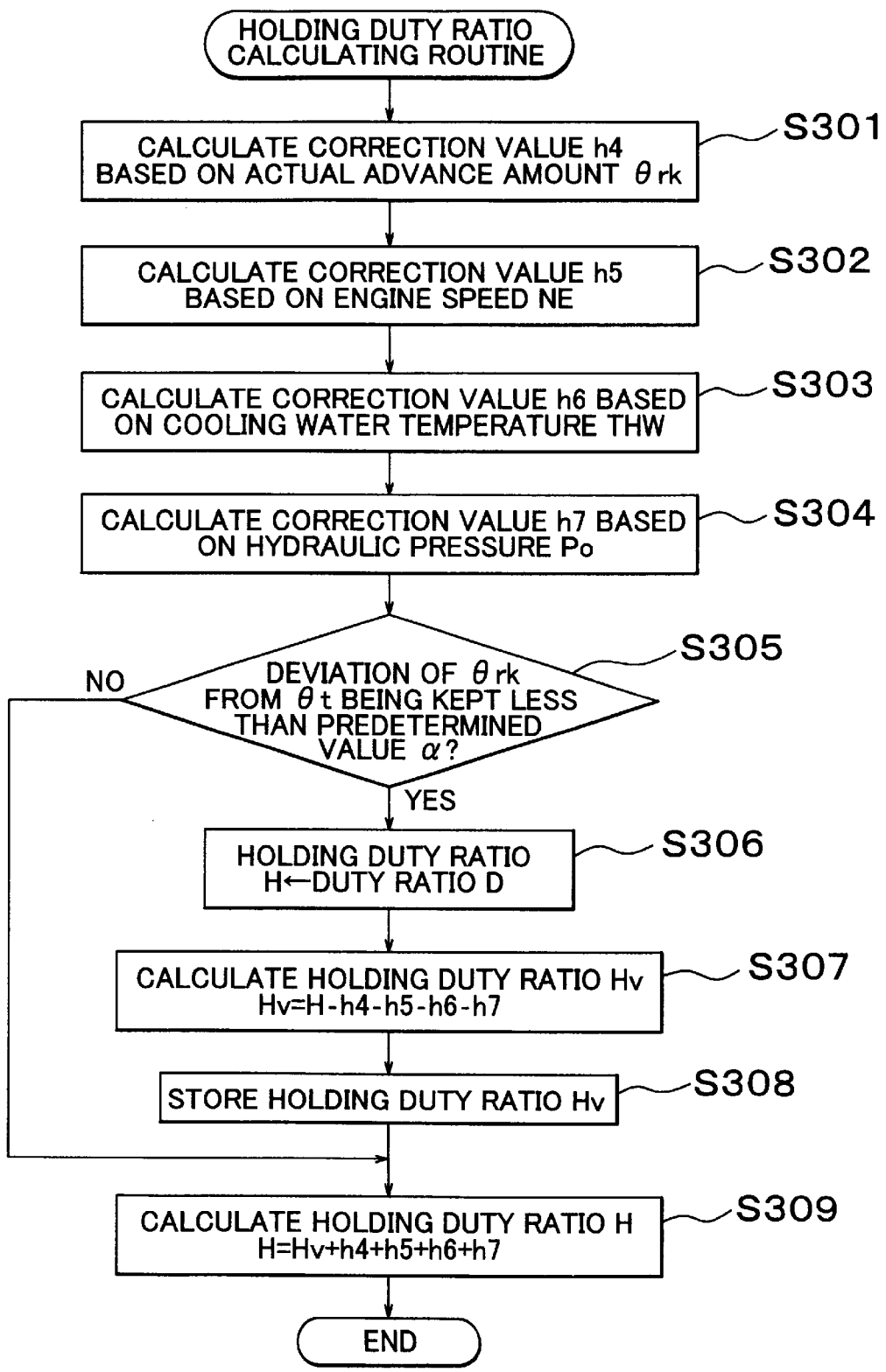
FIG. 8 is a flowchart illustrating a holding duty ratio calculating routine.

Next, a procedure of calculating a holding duty ratio H will be described with reference to FIG. 8. FIG. 8 is a flowchart illustrating a holding duty ratio calculating routine for calculating a holding duty ratio H. The holding duty ratio calculating routine as an interrupt processing routine is executed by the ECU 92 at predetermined time intervals.

A holding duty ratio H is calculated from a holding duty ratio Hv stored in the backup RAM 96 and correction values h4–h7 according to the following equation (3) in step S309 of the holding duty ratio calculating routine $$H = Hv + h4 + h5 + h6 + h7 \quad (3)$$

In the above equation (3), the correction values h4–h7 are calculated based on various parameters that affect the holding duty ratio H. The holding duty ratio Hv is a value that is obtained by subtracting the correction values h4–h7 from the holding duty ratio H and is therefore free from the effects or influences of the parameters. The holding duty ratio Hv is stored in a pre-assigned area of the backup RAM 96. The holding duty ratio H is calculated in view of the influences of the various parameters, by adding the correction values h4–h7 to the holding duty ratio Hv stored in the backup RAM 96.

Thus, the backup RAM 96 always stores the holding duty ratio Hv that is free from the influences of the parameters, namely, that is not influenced by the parameters. For calculation of a duty ratio D, a holding duty ratio H obtained by correcting the holding duty ratio Hv stored in the backup RAM 96 through the use (addition) of the correction values h4–h7 is used. Therefore, even if the various parameters change during a period between the storage of the holding duty ratio Hv as hold data and the calculation of a duty ratio D using the stored holding duty ratio Hv, the holding duty ratio H (serving as a center with respect to which the duty ratio D is increased or decreased) can be held in an appropriate state (i.e., at an appropriate value) irrespective of changes in the parameters.

In the holding duty ratio calculating routine, steps S301 to S304 are executed so as to calculate the correction values h4–h7 based on the actual advance amount $\theta rk$ (valve timing), the engine speed NE, the cooling water temperature THW and the hydraulic pressure Po, which are parameters that affect the holding duty ratio H.

Figure 9:
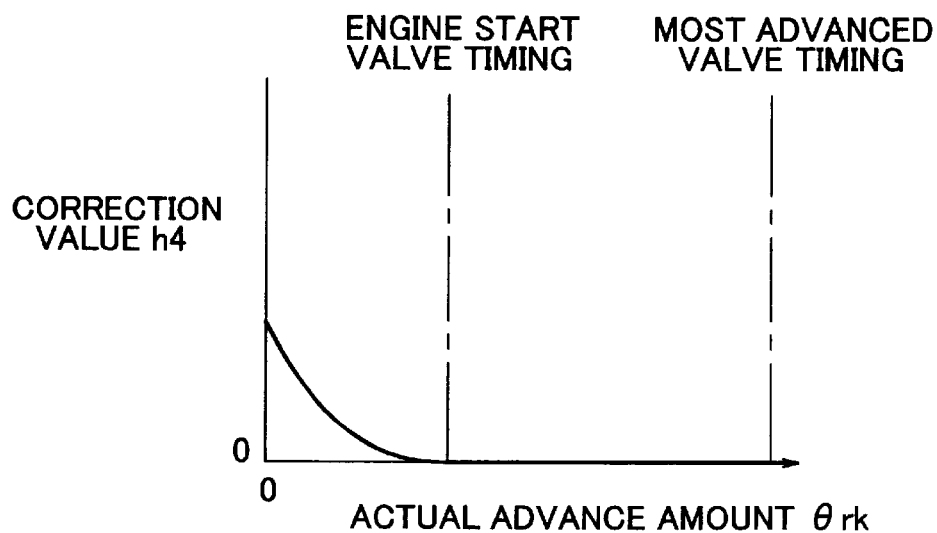
FIG. 9 is a graph indicating the relationship between a correction value h4 and the actual advance amount $\theta rk$.

In step S301, the ECU 92 calculates a correction value h4 based on the actual advance amount θrk. The correction value h4 changes with changes in the actual advance amount θrk, for example, in a manner as indicated in FIG. 9. As is apparent from FIG. 9, the correction value h4 is "0" when the actual advance amount θrk is on the advance side of a value corresponding to the engine start valve timing. The correction value h4 increases as the actual advance amount θrk changes (decreases) to values on the retard side of the engine start valve timing. This is because as the valve timing becomes closer to the most retarded state away from the engine start valve timing, the bias force of the thrust mechanisms 53 gradually increases, and therefore the influence of the bias force on the holding duty ratio H increases.

In step S302, the ECU 92 calculates a correction value h5 based on the engine speed NE. The engine speed NE affects the state of hydraulic fluid (engine state) and affects the holding duty ratio H because changes in the engine speed NE cause changes in the amount of hydraulic fluid delivered from the oil pump 52. The correction value h5 calculated based on the engine speed NE gradually increases as the engine speed NE increases. This is because as the engine speed NE increases, the amount of hydraulic fluid delivered from the oil pump 52 increases, which results in an increase in the influence on the holding duty ratio H due to the increase in the amount of hydraulic fluid delivered.

In step S303, the ECU 92 calculates a correction value h6 based on the cooling water temperature THW. The correction value h6 thus calculated varies depending upon the type of hydraulic fluid used in the system. The cooling water temperature THW affects the state of hydraulic fluid and affects the holding duty ratio H because changes in the cooling water temperature THW cause changes in the viscosity of the hydraulic fluid. The correction value h6 calculated based on the cooling water temperature THW gradually increases as the cooling water temperature THW decreases. This is because as the cooling water temperature THW (engine temperature) decreases, the viscosity of hydraulic fluid increases, resulting in an increase in the influence on the holding duty ratio H due to the increase in the viscosity of hydraulic fluid. The correction value h6 calculated based on the cooling water temperature THW is calculated depending upon the type of hydraulic fluid, thus providing different values for respective types of hydraulic fluid. This is because the viscosity of hydraulic fluid varies depending on not only the cooling water temperature THW but also the type of hydraulic fluid.

In step S304, the ECU 92 calculates a correction value h7 based on the hydraulic pressure Po. The hydraulic pressure Po affects the state of hydraulic fluid and affects the holding duty ratio H because changes in the hydraulic pressure P result in changes in the force that is exerted by hydraulic fluid to displace the intake camshaft 21 in the rotating direction. The correction value h7 calculated based on the hydraulic pressure Po gradually increases as the hydraulic pressure Po increases. This is because as the hydraulic pressure Po increases, the influence on the holding duty ratio H due to the increase in the hydraulic pressure Po increases.

The various values of h4–h7 can be determined empirically in advance and then stored as tables or maps in memory. Then, during execution of the FIG. 8 flowchart, the appropriate values for h4, h5, h6 and h7 are selected based upon θrk, NE, THW and Po, respectively.

After calculating the correction values h4–h7 by executing steps S301 to S304, the ECU 92 proceeds to step S305.

Step S305 is intended for determining whether the holding duty ratio Hv should be stored into the backup RAM 96 in the current situation. Namely, the ECU 92 determines in step S305 whether a deviation of the actual advance amount θrk from the target advance amount θt has been kept less than a predetermined value a for a certain period of time. If the state in which (θt−θrk) is less than α is not continued (i.e., a negative decision "NO" is obtained in step S305), the ECU 92 proceeds to step S309. In step S309, the ECU 92 calculates the holding duty ratio H according to the equation (3). For this calculation, the holding duty ratio Hv stored into the backup RAM 96 in the previous cycle is used.

If it is determined in step S305 that the state of "(θt−θrk) <α" has been maintained, the ECU 92 proceeds to step S306. Steps S306 to S308 are executed in order to calculate the holding duty ratio Hv based on the current duty ratio D, and storing the resultant holding duty ratio Hv as hold data into a predetermined area of the backup RAM 96.

In step S306, the ECU 92 sets the duty ratio D obtained while the state of "(θt−θrk)<α" is maintained, as a holding duty ratio. In step S307, the ECU 92 calculates a holding duty ratio Hv based on the holding duty ratio H and the correction values h4–h7 according to the following equation (4).

$$Hv = H - h4 - h5 - h6 - h7 \qquad (4)$$

In the above equation (4), the correction values h4–h7 are subtracted from the holding duty ratio H that is affected by various parameters, such as the actual advance amount θrk, the engine speed NE, the cooling water temperature THW, the hydraulic pressure Po, etc., so as to provide a holding duty ratio Hv that is free from the effects or influences of these parameters. Subsequently in step S308, the ECU 92 stores the holding duty ratio Hv into the predetermined area of the backup RAM 96. In step S309, the ECU 92 calculates a holding duty ratio H using the holding duty ratio Hv. After that, the ECU 92 temporarily ends the holding duty ratio calculating routine.

In the holding duty ratio calculating routine, the operation of subtracting the correction values h4–h7 in step S307 accomplishes correction of the holding duty ratio H by removing therefrom the effects of the actual advance amount θrk, the engine speed NE, the cooling water temperature THW and the hydraulic pressure Po. Assuming that the correction values h5–h7 are "0", for example, the holding duty ratio Hv takes a value on the valve timing advance side of the holding duty ratio H (i.e., a value shifted toward "0%") when the valve timing is on the retard side of the engine start valve timing. The difference between the holding duty ratio Hv and the holding duty ratio H increases as the actual advance amount θrk approaches "0" (corresponding to the most retarded position of the intake camshaft).

In the operation of adding the correction values h4–h7 in step S309, the ECU 92 corrects the holding duty ratio Hv by adding the correction values that are based upon the actual advance amount θrk, the engine revolution speed NE, the cooling water temperature THW and the hydraulic pressure Po to the holding duty ratio Hv. Assuming that the correction values h5–h7 are "0", for example, the resulting holding duty ratio H takes a value on the valve timing retard side of the holding duty ratio Hv (i.e., a value shifted toward "100%") when the valve timing is on the retard side of the engine start valve timing. The difference between the holding duty ratio Hv and the holding duty ratio H increases as the actual advance amount θrk approaches "0" (corresponding to the most retarded position of the intake camshaft).

Thus, the holding duty ratio H (holding duty ratio Hv) is corrected based on the various parameters that affect the holding duty ratio H, including the actual advance amount θrk (valve timing) that is related to the bias force of the thrust mechanisms 53. The duty ratio D is then corrected based on the thus corrected holding duty ratio H (holding duty ratio Hv). Therefore, when the duty ratio D is increased or decreased so as to bring the actual advance amount θrk closer to the target advance amount θt, the center with respect to which the duty ratio D is increased or decreased is prevented from deviating from an appropriate value due to the influences of the various parameters (θrk, NE, THW, Po), so that the valve timing can be accurately controlled.

The present embodiment in which the above-described operations are performed yields the following effects or advantages.

(1) The duty ratio D used for the valve timing control (driving control of the OCV 49) is calculated using the control gain P so that the actual advance amount θrk approaches the target advance amount θt. The characteristic of the rate of change of the valve timing in the control process for bringing the actual advance amount θrk closer to the target advance amount θt changes in accordance with the magnitude of the bias force of the thrust mechanisms 53. In the illustrated embodiment, the control gain P relating to the characteristic of the rate of change of the valve timing is corrected in accordance with the valve timing (actual advance amount θrk), which is a value corresponding to the bias force of the thrust mechanisms 53 currently acting on the intake camshaft 21. Therefore, even if the bias force changes with changes in the valve timing, the characteristic of the rate of change of the valve timing can be maintained in an appropriate state by controlling the valve timing based on the duty ratio D calculated from the control gain P and other parameters as described above, whereby the valve timing can be accurately controlled.

(2) The parameters that affect the characteristic of the rate of change of the valve timing include the engine speed NE, the cooling water temperature THW, the hydraulic pressure Po, etc., as well as the actual advance amount θrk (the bias force of the thrust mechanisms 53). The control gain P is calculated taking these parameters into consideration. That is, these parameters, which affect the condition of hydraulic fluid thereby affecting the characteristic of the rate of change of the valve timing changing rate, are taken into consideration for the calculation of the control gain P. Therefore, by controlling the valve timing based on the duty ratio D calculated from the control gain P, the characteristic of the rate of change of the valve timing can be maintained in an appropriate state independently of changes in the parameters, so that the valve timing can be more accurately or properly controlled.

(3) The basic control gain Pb used in the calculation of the control gain P is calculated from the difference between the target advance amount θt and the actual advance amount θrk, and other parameters as described above. The actual advance amount θr is determined by subtracting the most retarded state learned value G from the actual advance amount θr determined based on the detection signals from the crank position sensor 14c and the cam position sensor 21b. The most retarded state learned value G is obtained by learning a deviation of the actual advance amount θr measured when the target advance amount θt is set to "0 (most retarded position)" and the valve timing is thus set to the most retarded state, from an appropriate value "0" of the actual advance amount θr at this time. When the valve timing is controlled to the most retarded state in order to execute the most retarded state learning procedure, the bias force is applied by the thrust mechanisms 53 to the intake camshaft 21. Thus, incorrect learning of the most retarded state learned value may occur due to the influence of the bias force. That is, if the learning of the most retarded state learned value G is executed in a situation where the valve timing cannot be controlled to the most retarded timing against the aforementioned bias force, the deviation between the actual advance amount θr and the appropriate value ("0") may be learned as a learned value when the actual valve timing is not in the most retarded state and the actual advance amount θr has not reached "0". In the illustrated embodiment, however, incorrect learning of the most retarded state learned value G is avoided by inhibiting the learning of the most retarded state learned value G in situations where the valve timing cannot be controlled to the most retarded state against the bias force. Thus, valve timing control can be performed taking account of the bias force of the thrust mechanisms 53, so that the valve timing can be properly controlled regardless of the above-mentioned bias force.

(4) The determination as to whether the valve timing can be controlled to the most retarded state is made based on parameters related to the state of hydraulic fluid (engine state), including the hydraulic pressure Po, the cooling water temperature THW, the oil temperature THO, etc. If it is determined based on these parameters that the state of hydraulic fluid (engine state) does not allow the valve timing to be controlled to the most retarded state, learning of the most retarded state learned value G is inhibited, thereby avoiding incorrect or false learning of the most retarded state learned value G. It is thus possible to prevent a situation in which accurate valve timing control becomes difficult because of incorrect learning of the most retarded state learned value G.

(5) The duty ratio D used for the valve timing control (driving control of the OCV 49) is calculated so that the actual advance amount θr of the valve timing approaches the target advance amount θt. When the deviation of the actual advance amount θr from the target advance amount θt is kept less than the predetermined value a for a certain period of time, the duty ratio D at this time is set or stored as a holding duty ratio H. When the duty ratio D is increased or decreased so as to bring the actual advance amount θr closer to the target advance amount θt, the holding duty ratio H provides the center with respect to which the duty ratio D is increased or decreased. The holding duty ratio H is affected by the bias force of the thrust mechanisms 53 when the valve timing is on the retard side of the engine start valve timing. When the valve timing is on the advance side of the engine start valve timing, the holding duty ratio H is not affected by the bias force. Therefore, when the valve timing changes from the advance side of the engine start valve timing (i.e., a range in which the bias force does not act on the intake camshaft 21) to the retard side of the engine start valve timing (i.e., a range in which the bias force acts on the intake camshaft 21), for example, the center of increases and decreases of the duty ratio D may deviate from an appropriate value and the valve timing may not be controlled properly, since the holding duty ratio H is not affected by the bias force. In the illustrated embodiment, however, the holding duty ratio H is corrected by the correction value h4 calculated in accordance with the bias force (actual advance amount θrk). The duty ratio D is then calculated based on the thus corrected holding duty ratio H. Thus, the center of increases and decreases of the duty ratio D is prevented from deviating from the appropriate state, whereby the valve timing can be properly controlled.

(6) The holding duty ratio H is corrected to provide a holding duty ratio Hv from which the influence of the bias force is removed by subtracting the correction value h4 from the holding duty ratio H. The thus-determined holding duty ratio Hv is stored into the backup RAM 96. The holding duty ratio Hv stored in the backup RAM 96 is corrected to provide a holding duty ratio H to which the influence of the bias force is given by adding the correction value h4 to the holding duty ratio Hv. The thus-determined holding duty ratio H is used to calculate the duty ratio D. Therefore, even in the case where a holding duty ratio Hv is stored into the backup RAM 96 when the valve timing is on the advance side of the engine start valve timing (i.e., in a range in which the bias force does not act on the intake camshaft 21) and the stored holding duty ratio Hv is used for calculation of a duty ratio D when the valve timing is on the retard side of the engine start valve timing (i.e., in a range in which the bias force acts on the intake camshaft 21), the center with respect to which the duty ratio D is increased or decreased can be maintained in an appropriate state. To the contrary, in the case where a holding duty ratio Hv is stored into the backup RAM 96 when the valve timing is on the retard side of the engine start valve timing and the stored holding duty ratio Hv is used for calculation of a duty ratio D when the valve timing is on the advance side of the engine start valve timing, the center of increases and decreases of the duty ratio D can also be maintained in an appropriate state.

(7) When the valve timing is in a range on the retard side of the engine start valve timing, the bias force of the thrust mechanisms 53 increases as the actual advance amount θrk becomes closer to "0" (corresponding to the most retarded position of the intake camshaft). Meanwhile, the correction value h4 based on the actual advance amount θrk increases as the actual advance amount θrk approaches "0", as indicated in FIG. 9. Therefore, the holding duty ratio Hv obtained by subtracting the correction value h4 from the holding duty ratio H accurately assumes a value that is free from the influence of the bias force of the thrust mechanisms 53. Furthermore, the holding duty ratio H obtained by adding the correction value h4 to the holding duty ratio Hv accurately assumes a value that accounts for the influence of the bias force. Therefore, although the bias force changes with changes in the valve timing, the center of increases and decreases of the duty ratio D calculated from the holding duty ratio H and other parameters, discussed above, can be maintained in an appropriate state.

(8) The parameters that affect the holding duty ratio H include the engine speed NE, the cooling water temperature THW, the hydraulic pressure Po, etc., as well as the bias force (actual advance amount θrk) of the thrust mechanisms 53. That is, these parameters affect the holding duty ratio H by affecting the state of hydraulic fluid (engine state). In the illustrated embodiment, the correction values h5–h7 calculated based on the parameters, in addition to the correction value h4, are subtracted from the holding duty ratio H, and the value resulting from the subtraction is stored as the holding duty ratio Hv into the backup RAM 96.

Furthermore, the holding duty ratio H is calculated by adding the correction values h5–h7, as well as the correction value h4, to the stored holding duty ratio Hv. Therefore, the duty ratio D used for valve timing control can be set to an optimal value independently of changes in the parameters, such as the engine speed NE, the cooling water temperature THW and the hydraulic pressure Po., so that the valve timing can be further accurately controlled.

Second Embodiment

A second embodiment of the invention will next be described with reference to FIGS. 10 and 11. In this embodiment, when the deviation of the actual advance amount θrk from the target advance amount θt continues to be less than the predetermined value α, the holding duty ratio H is stored as a holding duty ratio Hv1 or as a holding duty ratio Hv2 depending upon whether the bias force of the thrust mechanisms 53 acts on the intake camshaft 21, unlike the first embodiment in which a value obtained by removing the influence of the bias force from the holding duty ratio H is simply stored as a holding duty ratio Hv. Furthermore, in order to calculate a holding duty ratio H for calculation of a duty ratio D in the second embodiment, a selected one of the holding duty ratios Hv1 and Hv2 is used depending upon whether the bias force is currently acting on the intake camshaft, instead of correcting the holding duty ratio Hv in view of the bias force as in the first embodiment. The holding duty ratio H thus calculated is regarded as taking account of the bias force of the thrust mechanisms 53. Thus, this embodiment differs from the first embodiment in the manner of calculating the holding duty ratio H in view of the above-indicated bias force. In the following, only portions of the second embodiment that are different from those of the first embodiment will be described below, while the other portions of the second embodiment will not be described in detail.

Figure 10:
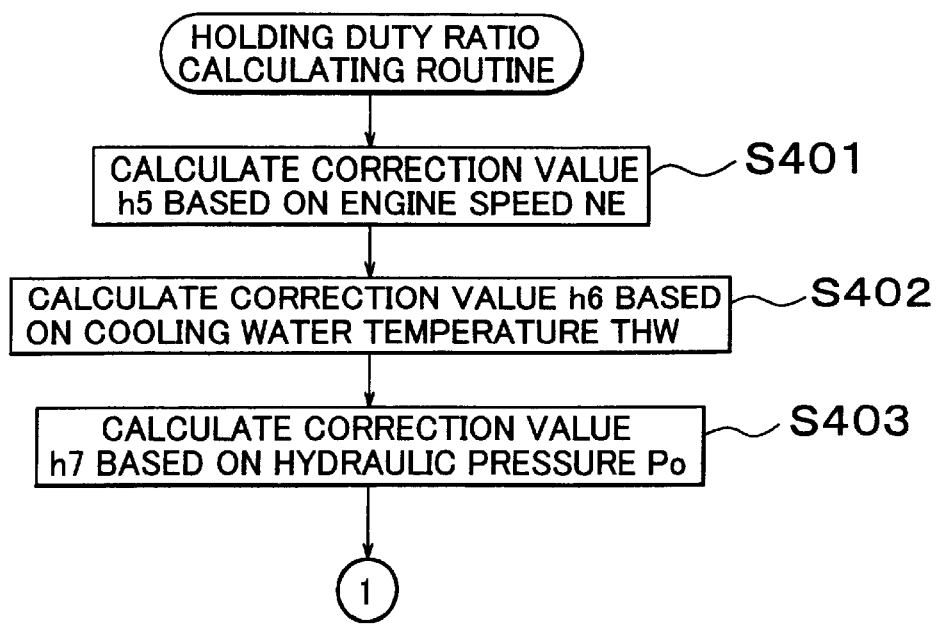
FIG. 10 is a flowchart illustrating a holding duty ratio calculating routine according to a second embodiment of the invention.
Figure 11:
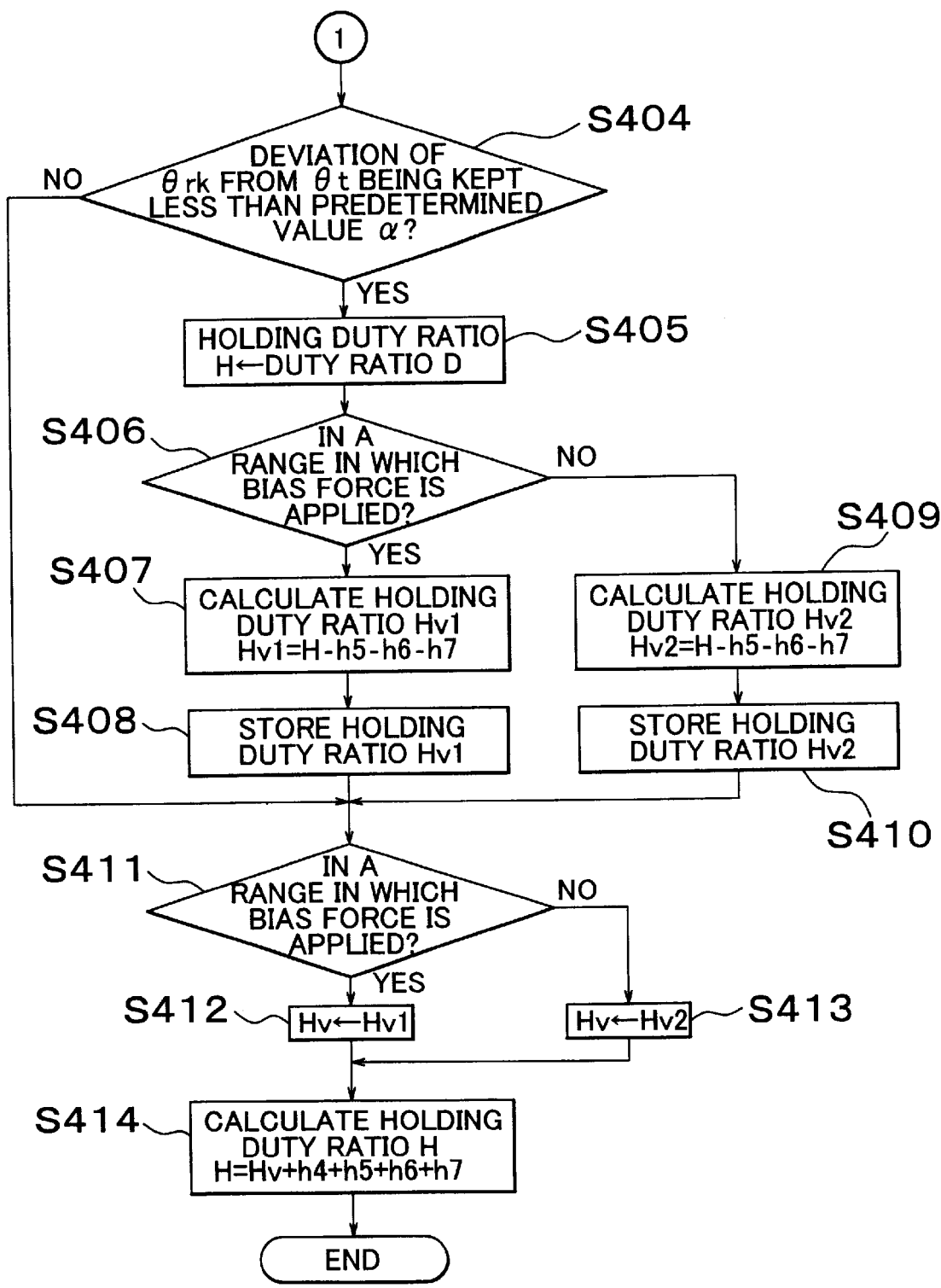
FIG. 11 is a flowchart illustrating the holding duty ratio calculating routine of the second embodiment.

FIGS. 10 and 11 are flowcharts illustrating a holding duty ratio calculating routine in this embodiment. In the holding duty ratio calculating routine of this embodiment, an operation corresponding to step S301 of the holding duty ratio calculating routine (FIG. 8) in the first embodiment is eliminated, and steps S406–S410 are executed in place of corresponding steps S307, S308 in the first embodiment. Furthermore, in the holding duty ratio calculating routine of this embodiment, operations of steps S411–S413 are added to the operations performed in the holding duty ratio calculating routine of the first embodiment.

In the holding duty ratio calculating routine of this embodiment, step S401 (FIG. 10) to step S405 (FIG. 11) correspond to steps S302–S306 in the holding duty ratio calculating routine of the first embodiment. That is, in steps S401–S403 (FIG. 10), correction values h5–h7 are calculated based on the engine speed NE, the cooling water temperature THW and the hydraulic pressure Po. Subsequently in step S404 (FIG. 11), it is determined whether the deviation of the actual advance amount θrk from the target advance amount θt has been kept less than the predetermined value a for a certain length of time. If a negative decision (NO) is obtained in step S404, the control flow proceeds to step S411. Conversely, if an affirmative decision (YES) is obtained in step S404, the control flow proceeds to step S405 in which the duty ratio D obtained when the deviation has been kept less than the predetermined value α is set as a holding duty ratio H. Subsequently, the control flow goes to step S406.

In steps S406–S410, the holding duty ratio H is stored as a selected one of a holding duty ratio Hv1 affected by the bias force of the thrust mechanisms 53 and a holding duty ratio Hv2 not affected by the bias force. In step S406, the ECU 92 determines whether the valve timing is in a range in which the bias force of the thrust mechanisms 53 acts on the intake camshaft 21, namely, whether the valve timing is on the retard side of the engine start valve timing.

If it is determined in step S406 that the valve timing is in the range in which the bias force is exerted, the ECU 92 proceeds to step S407, in which the ECU 92 calculates a holding duty ratio Hv1 by subtracting the correction values h5–h7 from the holding duty ratio H. Subsequently in step S408, the holding duty ratio Hv1 is stored as a value affected by the bias force into a predetermined area of the backup RAM 96. Subsequently, the ECU 92 proceeds to step S411.

If it is determined in step S406 that the valve timing is not within the range in which the bias force is exerted, the ECU 92 proceeds to step S409, in which the ECU 92 calculates a holding duty ratio Hv2 by subtracting the correction values h5–h7 from the holding duty ratio H. Subsequently in step S410, the holding duty ratio Hv2 is stored as a value not affected by the bias force into a predetermined area of the backup RAM 96. The ECU 92 subsequently proceeds to step S411.

Steps S411–S414 are executed in order to use a selected one of the holding duty ratios Hv1, Hv2 for calculation of the holding duty ratio H depending upon whether the bias force acts on the intake camshaft 21. In step S411, the ECU 92 determines whether the valve timing is within the range in which the bias force of the thrust mechanisms 53 acts on the intake camshaft 21, that is, whether the valve timing is on the retard side of the engine start valve timing.

If step S411 determines that the valve timing is within the range in which the bias force is applied, the ECU 92 proceeds to step S412, in which the ECU 92 sets the holding duty ratio Hv1 stored in the backup RAM 96 as a holding duty ratio Hv. This holding duty ratio Hv is equivalent to a value that accounts for the influence of the bias force. Subsequently in step S414, the ECU 92 calculates a holding duty ratio H for use in the calculation of a duty ratio D, by adding the correction values h5–h7 to the holding duty ratio Hv.

If step S411 determines that the valve timing is not within the range in which the bias force is applied, the ECU 92 proceeds to step S413, in which the ECU 92 sets the holding duty ratio Hv2 stored in the backup RAM 96 as a holding duty ratio Hv. This holding duty ratio Hv is equivalent to a value that is free from the influence of the bias force. Subsequently in step S414, the ECU 92 calculates a holding duty ratio H for use in calculation of the duty ratio D, by adding the correction values h5–h7 to the holding duty ratio Hv. After calculating the holding duty ratio H in this manner, the ECU 92 temporarily ends the holding duty ratio calculating routine.

The second embodiment, in which the above-described operations are performed, yields the following effect or advantage, in addition to the aforementioned advantages (1) to (4) and (8) of the first embodiment.

(9) If the deviation of the actual advance amount θrk from the target advance amount θt has been kept less than the predetermined value α for a certain length of time, the holding duty ratio H is stored into the backup RAM 96 either as the holding duty ratio Hv1 when the bias force of the thrust mechanisms 53 is applied or as the holding duty ratio Hv2 when the bias force is not applied. Furthermore, in order to calculate a holding duty ratio H for the calculation of a duty ratio D, a selected one of the holding duty ratios Hv1, Hv2 stored in the backup RAM 96 is used depending upon whether the bias force is acting on the intake camshaft 21. Since the holding duty ratio H calculated as described above is used to calculate a duty ratio D, the duty ratio D is regarded as taking account of the above-indicated bias force. Therefore, when the duty ratio D is increased or decreased so as to bring the actual advance amount θrk closer to the target advance amount θt, the center with respect to which the duty ratio D is increased or reduced is substantially prevented from deviating from an appropriate position, so that the valve timing can be accurately controlled.

The illustrated embodiments may be modified, for example, in the following manners.

In the foregoing embodiments, the holding duty ratio H is corrected based on parameters that affect the holding duty ratio H, including the engine speed NE, the cooling water temperature THW and the hydraulic pressure Po, as well as the actual advance amount θrk (the bias force of the thrust mechanisms 53). However, the correction need not be performed based on all of these parameters. For example, the correction may be performed based on some of the above parameters, or no correction may be performed on the holding duty ratio H.

In the first embodiment, the influence of the bias force of the thrust mechanisms 53 is removed from or added to the holding duty ratio H by correcting the holding duty ratio H in accordance with the actual advance amount θr, which is a parameter related to the magnitude of the bias force. However, the invention is not limited to this arrangement. For example, the holding duty ratio H may be corrected uniformly independently of the actual advance amount θr when the valve timing is on the retard side of the engine start valve timing.

As a parameter related to the magnitude of the bias force of the thrust mechanisms 53, the illustrated embodiments may adopt the target advance amount θt, the actual advance amount θr, or the like, instead of the actual advance amount θrk.

In the first embodiment, in order to store the holding duty ratio Hv as a value not affected by the bias force of the thrust mechanisms 53 into the backup RAM 96 irrespective of whether the bias force is acting on the intake camshaft 21, step S307 (FIG. 9) is executed to correct the holding duty ratio H by subtracting therefrom the correction value h4 calculated based on the actual advance amount θrk (corresponding to the bias force). However, the invention is not limited to this manner of storing the holding duty ratio Hv. For example, the holding duty ratio Hv may be stored into the backup RAM 96 under a condition that the bias force is not acting on the intake camshaft 21, that is, a condition that the valve timing is on the advance side of the engine start valve timing. In this case, the operation to store the holding duty ratio Hv into the backup RAM 96 is inhibited when the valve timing is on the retard side of the engine start valve timing (when the valve timing is within a range in which the bias force is applied). This eliminates the need to perform correction by subtracting the correction value h4 from the holding duty ratio H in step S307 in order to store a holding duty ratio Hv that is not affected by the bias force. When a holding duty ratio H for use in calculation of a duty ratio D is then to be calculated, the correction value h4 is added to the stored holding duty ratio Hv in step S309, to thus achieve correction associated with application of the bias force to the intake camshaft 21. Thus, substantially the same effects or advantages as described above with respect to the first embodiment are provided even where the holding duty ratio Hv is processed in the manner as described above.

In the first embodiment, the target advance amount θt may be set to a value outside the range in which the bias force of the thrust mechanisms 53 acts on the intake camshaft 21, namely, set to a value outside the range between the value corresponding to the engine start valve timing and "0 (most retarded position)", so that the storing of the holding duty ratio Hv into the backup RAM 96 will not be executed when the actual advance amount is within the range in which the bias force is applied. In this modified example, the holding duty ratio Hv stored in the backup RAM 96 is regarded as not affected by the bias force, thus eliminating the need to correct the holding duty ratio H by subtracting the correction value h4 therefrom in step S307, thereby to remove the influence of the bias force. Furthermore, the setting of the target advance amount θt as described above eliminates the need to increase or decrease the duty ratio D so as to bring the actual advance amount θrk closer to the target advance amount θt within the range in which the bias force is applied. This consequently eliminates a conventional problem that the center of increases and decreases of the duty ratio D deviates from its appropriate state due to the influence of the bias force and the valve timing cannot be accurately controlled.

In the first embodiment, correction with regard to the holding duty ratio H by use of the correction value h4, namely, removal and addition of the influence of the bias force, may not be performed when the valve timing is on the advance side of the engine start valve timing and no bias force is applied by the thrust mechanisms 53. This makes it possible prevent correction based on the correction value h4 from being unnecessarily executed, for example, from being executed when the bias force does not act on the intake camshaft 21 and the correction value h4 is equal to "0".

In the most retarded state learned value calculating routine (FIG. 7) of the illustrated embodiments, when it is determined in step S204 that the engine speed NE is less than the predetermined value "b", steps S205 and S206 are performed prior to determining whether to execute learning of the most retarded state learned value G (steps S207–S211). However, the invention is not limited to this manner of learning the value G. For example, when it is determined in step S204 that NE is smaller than "b", learning of the most retarded state learned value G may be immediately inhibited independently of the cooling water temperature THW and the oil temperature THO. In this case, steps S205 and S206 may be omitted.

In the illustrated embodiments, it is determined whether the valve timing can be retarded to the most retarded state against the bias force in the current situation, based on the hydraulic pressure Po, the engine speed NE, the cooling water temperature THW, the oil temperature THO, etc., in order to control execution of the learning of the most retarded state learned value G. However, the invention is not limited to this manner of control. For example, the determination as described above may be made based solely on the hydraulic pressure Po, or may be made based on the engine speed NE, the cooling water temperature THW, the oil temperature THO, etc., independently of the hydraulic pressure Po.

In the illustrated embodiments, the control gain P is calculated or obtained from a map or the like, based on not only the deviation of the actual advance amount θrk from the target advance amount θt but also the engine speed NE which is a parameter that affects the characteristic of the rate of change of valve timing. However, the invention is not limited to this manner of determining the control gain P. It is thus unnecessary to use the engine speed NE as a parameter for calculating the basic control gain Pb. For example, the basic control gain Pb may be multiplied by a correction value determined based on the engine speed NE, so that the resulting control gain P reflects the engine speed NE.

In the illustrated embodiments, the control gain P is corrected on the basis of parameters that affect the control gain P, which parameters include the cooling water temperature THW, the hydraulic pressure Po, etc., as well as the actual advance amount θrk (the bias force of the thrust mechanisms 53). It is, however, not necessary to perform correction based on all of these parameters. For example, the correction may be performed using some of these parameter, or none of them.

In the illustrated embodiments, the characteristic of the rate of change of the valve timing is made appropriate regardless of the bias force of the thrust mechanisms 53, by correcting the control gain P in accordance with the actual advance amount θrk which is a parameter related to the magnitude of the bias force. However, the invention is not limited to this arrangement. For example, the above correction may be performed uniformly regardless of the actual advance amount θrk when the valve timing is on the retard side of the engine start valve timing.

In the illustrated embodiments, the correction of the control gain P using the correction value h1 calculated based on the actual advance amount θrk (the bias force of the thrust mechanism 53) is performed irrespective of whether the valve timing is on the retard side of the engine start valve timing (whether the bias force is acting on the intake camshaft 21). However, the invention is not limited to this manner of correcting the control gain P. For example, it is possible to not perform the correction of the control gain P using the correction value h1 when the valve timing is on the advance side of the engine start valve timing (when the bias force is not applied). This prevents the correction of the control gain P based on the correction value h1 from being unnecessarily performed, for example, from being executed when the bias force is not applied and the correction value h1 is equal to "1.0".

In the illustrated embodiments, the bias force of the thrust mechanisms 53 is taken into consideration with regard to calculation of the control gain P, calculation of the holding duty ratio H, and execution of learning of the most retarded state learned value G. However, the invention is not limited to this manner of control. That is, the bias force may be taken into consideration only with respect to one or two of the above three operations, i.e., calculation of the control gain P, calculation of the holding duty ratio H, and execution of learning of the most retarded state learned value G. In this case, too, the duty ratio D is calculated in view of the bias force, and therefore the valve timing can be performed with the bias force taken into consideration.

In the illustrated embodiments, the invention is applied to a valve timing control apparatus for changing the valve timing of the intake valves 19. The invention may also be applied to a valve timing control apparatus for changing the valve timing of the exhaust valves 20.

In the illustrated embodiments, the invention is applied to the valve timing control apparatus that utilizes the biasing or urging action of the thrust mechanisms 53 to control the valve timing to the engine start valve timing when the valve timing is on the retard side of the engine start valve timing. However, the invention is not limited to this application. For example, the invention may also be applied to a valve timing control apparatus in which a bias force appears over the entire control range of the valve timing, as in the case where the bias force is applied to urge the valve timing toward the most advanced state or the most retarded state. If the invention is applied to a valve timing control apparatus in which the valve timing is urged toward the most advanced state, the invention may be applied not only to an apparatus in which the bias force appears over the entire control range of the valve timing, but also to an apparatus in which the bias force appears only in an advance-side range of the entire control range of the valve timing.

In the illustrated embodiment, the controller (the ECU 92) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A valve timing control apparatus of an internal combustion engine that includes a biasing device that exerts a bias force so as to bring valve timing of the engine into a predetermined state when the valve timing is in a predetermined range, said valve timing control apparatus comprising:

a controller that controls the valve timing while taking into account the bias force of the biasing device; wherein:

the predetermined state is between a most retarded state and a most advanced state, and the biasing device exerts the bias force so as to bring the valve timing of the engine into the predetermined state when the valve timing is on a retard side of the predetermined state; and the controller controls the valve timing while taking into account the bias force of the biasing device at least when the valve timing is on the retard side of the predetermined state.

2. A valve timing control apparatus according to claim 1, wherein:

the predetermined state is between a most retarded state and a most advanced state, and the biasing device exerts the bias force so as to bring the valve timing of the engine into the predetermined state when the valve timing is on a retard side of the predetermined state; and the controller controls the valve timing while taking into account the bias force of the biasing device at least when the valve timing is on the retard side of the predetermined state.

3. A valve timing control apparatus of an internal combustion engine that includes a biasing device that exerts a bias force so as to bring valve timing of the engine into a predetermined state when the valve timing is in a predetermined range, said valve timing control apparatus comprising:

a controller that controls the valve timing while taking into account the bias force of the biasing device, wherein the controller:

sets a target value of the valve timing in accordance with an operating state of the engine; and calculates a control amount used for controlling the valve timing so that the valve timing approaches the target value, said controller calculating the control amount while taking into account the bias force of the biasing device.

4. A valve timing control apparatus according to claim 3, wherein the controller:

increases or decreases a control gain used for calculation of the control amount, based on an actual measurement value of the valve timing and said target value, so that the actual measurement value approaches the target value; and corrects the control gain in accordance with the bias force of the biasing device, and calculates the control amount used for controlling the valve timing.

5. A valve timing control apparatus according to claim 4, wherein the controller corrects the control gain in accordance with the bias force of the biasing device only when the valve timing is in a range in which the biasing device exerts the bias force.

6. A valve timing control apparatus according to claim 4, wherein the controller calculates a correction value used for correction of the control gain in accordance with the bias force of the biasing device, by using the valve timing at the time of calculation.

7. A valve timing control apparatus according to claim 4, wherein the controller changes the control gain based on at least one parameter that influences a rate of change of the valve timing, in addition to the bias force of the biasing device.

8. A valve timing control apparatus according to claim 7, wherein:

the controller controls a variable valve timing mechanism based on the control amount, said variable valve timing mechanism being actuated by a pressure of hydraulic fluid so as to change the valve timing; and the at least one parameter based on which the controller changes the control gain comprises one or more parameters that are related to a state of the hydraulic fluid.

9. A valve timing control apparatus according to claim 3, wherein:

the controller executes most retarded state learning to obtain a learned value that indicates a deviation of an actual measurement value of the valve timing when the valve timing is controlled to the most retarded state from a predetermined reference value;

the controller calculates the control amount used for controlling the valve timing, based on the learned value; and the controller controls execution of the most retarded state learning while taking into account the bias force of the biasing device.

10. A valve timing control apparatus according to claim 9, wherein:

the biasing device exerts the bias force so as to advance the valve timing of the engine; and the controller inhibits the most retarded state learning when an engine condition does not permit the valve timing to be controlled to the most retarded state against the bias force of the biasing device.

11. A valve timing control apparatus according to claim 10, wherein:

the controller controls a variable valve timing mechanism based on the control amount, said variable valve timing mechanism being actuated by a pressure of hydraulic fluid so as to change the valve timing; and the controller inhibits the most retarded learning when the hydraulic fluid used for actuating the variable valve timing mechanism is in a condition that does not permit the valve timing to be controlled to the most retarded state against the bias force of the biasing device.

12. A valve timing control apparatus according to claim 3, further comprising a memory that stores, as holding data, the control amount measured when a deviation of an actual measurement value of the valve timing from the target value thereof is maintained less than a predetermined value; and wherein the controller corrects the holding data in accordance with the bias force of the biasing device, and calculates the control amount using the holding data.

13. A valve timing control apparatus according to claim 12, wherein the controller corrects the holding data in accordance with the bias force only when the valve timing is in a range in which the biasing device exerts the bias force.

14. A valve timing control apparatus according to claim 12, wherein the controller:

corrects the holding data so as to remove an influence of the bias force of the biasing device therefrom before the holding data derived from the measured control amount is stored into the memory; and corrects the holding data stored in the memory so as to add an influence of the bias force of the biasing device thereto before the holding data stored in the memory is used for calculation of the control amount.

15. A valve timing control apparatus according to claim 12, wherein the controller:

inhibits the holding data from being stored into the memory when the valve timing is in a range in which the biasing device exerts the bias force; and corrects the holding data stored in the memory so as to add an influence of the bias force of the biasing device thereto before the holding data stored in the memory is used for calculation of the control amount.

16. A valve timing control apparatus according to claim 12, wherein the controller:

sets the target value of the valve timing to a value that is outside a range in which the biasing device exerts the bias force; and corrects the holding data in accordance with the bias force of the biasing device, and calculates the control amount using the holding data.

17. A valve timing control apparatus according to claim 12, wherein the controller calculates a correction value used for correction of the holding data, based on the valve timing at the time of calculation.

18. A valve timing control apparatus according to claim 12, wherein the controller changes the holding data based on at least one parameter that influences the holding data, in addition to the bias force of the biasing device.

19. A valve timing control apparatus according to claim 18, wherein:

the controller controls a variable valve timing mechanism based on the control amount, said variable valve timing mechanism being actuated by a pressure of hydraulic fluid so as to change the valve timing; and said at least one parameter based on which the controller changes the holding data comprises one or more parameters that are related to a state of the hydraulic fluid.

20. A valve timing control apparatus according to claim 3, further comprising:

a first memory that stores the control amount as first holding data at the time when a deviation of an actual measurement value of the valve timing from the target value thereof is maintained less than a predetermined value, under a condition that the valve timing is in a first range in which the biasing device exerts the bias force; and a second memory that stores the control amount as second holding data at the time when the deviation of the actual measurement value of the valve timing from the target value thereof is maintained less than the predetermined value, under a condition that the valve timing is in a second range in which the biasing device does not exert the bias force;

wherein the controller calculates the control amount using the first holding data stored in the first memory when the valve timing is in the first range in which the biasing device exerts the bias force, and calculates the control amount using the second holding data stored in the second memory when the valve timing is in the second range in which the biasing device does not exert the bias force.

21. A valve timing control apparatus according to claim 20, wherein the controller changes the holding data based on at least one parameter that influences the holding data, in addition to the bias force of the biasing device.

22. A valve timing control apparatus according to claim 21, wherein:

the controller controls a variable valve timing mechanism based on the control amount, said variable valve timing mechanism being actuated by a pressure of hydraulic fluid so as to change the valve timing; and said at least one parameter based on which the controller changes the holding data comprises one or more parameters that are related to a state of the hydraulic fluid.

23. A method of performing valve timing control for an internal combustion engine that includes a biasing device that exerts a bias force so as to bring valve timing of the engine into a predetermined state when the valve timing is in a predetermined range, the method comprising the step of:

controlling the valve timing while taking into account the bias force of the biasing device; wherein:

the predetermined state is between a most retarded state and a most advanced state, and the biasing device exerts the bias force so as to bring the valve timing of the engine into the predetermined state when the valve timing is on a retard side of the predetermined state; and the controlling step includes controlling the valve timing while taking into account the bias force of the biasing device at least when the valve timing is on the retard side of the predetermined state.

24. A method of performing valve timing control for an internal combustion engine that includes a biasing device that exerts a bias force so as to bring valve timing of the engine into a predetermined state when the valve timing is in a predetermined range, the method comprising the step of:

controlling the valve timing while taking into account the bias force of the biasing device, wherein the controlling step includes the sub-steps of:

setting a target value of the valve timing in accordance with an operating state of the engine; and calculating a control amount used for controlling the valve timing so that the valve timing approaches the target value, said calculating of the control amount being performed while taking into account the bias force of the biasing device.

25. A method according to claim 24, wherein the predetermined state is between a most retarded state and a most advanced state, and the biasing device exerts the bias force so as to bring the valve timing of the engine into the predetermined state when the valve timing is on a retard side of the predetermined state; and the controlling step includes controlling the valve timing while taking into account the bias force of the biasing device at least when the valve timing is on the retard side of the predetermined state.

26. A method according to claim 25, wherein the step of calculating the control amount includes:

increasing or decreasing a control gain that is used for calculation of the control amount, based on an actual measurement value of the valve timing and said target value, so that the actual measurement value approaches the target value;

correcting the control gain in accordance with the bias force of the biasing device; and calculating the control amount used for controlling the valve timing.

27. A method according to claim 26, wherein the control gain is corrected in accordance with the bias force of the biasing device only when the valve timing is in a range in which the biasing device exerts the bias force.

28. A method according to claim 26, further comprising calculating a correction value used for correction of the control gain in accordance with the bias force of the biasing device, by using the valve timing at the time of calculation.

29. A method according to claim 26, further comprising changing the control gain based on at least one parameter that influences a rate of change of the valve timing, in addition to the bias force of the biasing device.

30. A method according to claim 29, further comprising:

controlling a variable valve timing mechanism based on the control amount, said variable valve timing mechanism being actuated by a pressure of hydraulic fluid so as to change the valve timing; and said at least one parameter based on which the control gain is changed comprises one or more parameters that are related to a state of the hydraulic fluid.

31. A method according to claim 25, further comprising:

executing a most retarded state learning procedure to obtain a learned value that indicates a deviation of an actual measurement value of the valve timing when the valve timing is controlled to the most retarded state from a predetermined reference value;

calculating the control amount used for controlling the valve timing, based on the learned value; and executing the most retarded state learning procedure while taking into account the bias force of the biasing device.

32. A method according to claim 31, wherein the biasing device exerts the bias force so as to advance the valve timing of the engine; and further comprising inhibiting performance of the most retarded state learning procedure when an engine condition does not permit the valve timing to be controlled to the most retarded state against the bias force of the biasing device.

33. A method according to claim 32, further comprising:

controlling a variable valve timing mechanism based on the control amount, said variable valve timing mechanism being actuated by a pressure of hydraulic fluid so as to change the valve timing; and inhibiting performance of the most retarded learning procedure when the hydraulic fluid used for actuating the variable valve timing mechanism is in a condition that does not permit the valve timing to be controlled to the most retarded state against the bias force of the biasing device.

34. A method according to claim 25, wherein a memory stores, as holding data, the control amount measured when a deviation of an actual measurement value of the valve timing from the target value thereof is maintained less than a predetermined value, and wherein the step of calculating the control amount includes:

correcting the holding data in accordance with the bias force of the biasing device; and calculating the control amount using the holding data.

35. A method according to claim 34, wherein the holding data is corrected in accordance with the bias force only when the valve timing is in a range in which the biasing device exerts the bias force.

36. A method according to claim 34, further comprising:

correcting the holding data so as to remove an influence of the bias force of the biasing device therefrom before the holding data derived from the measured control amount is stored into the memory; and correcting the holding data stored in the memory so as to add an influence of the bias force of the biasing device thereto before the holding data stored in the memory is used for calculation of the control amount.

37. A method according to claim 34, further comprising:

inhibiting the holding data from being stored into the memory when the valve timing is in a range in which the biasing device exerts the bias force; and correcting the holding data stored in the memory so as to add an influence of the bias force of the biasing device thereto before the holding data stored in the memory is used for calculation of the control amount.

38. A method according to claim 34, further comprising:

setting the target value of the valve timing to a value that is outside a range in which the biasing device exerts the bias force;

correcting the holding data in accordance with the bias force of the biasing device; and calculating the control amount using the holding data.

39. A method according to claim 34, further comprising calculating a correction value used for correction of the holding data, based on the valve timing at the time of calculation.

40. A method according to claim 34, further comprising changing the holding data based on at least one parameter that influences the holding data, in addition to the bias force of the biasing device.

41. A method according to claim 40, further comprising:

controlling a variable valve timing mechanism based on the control amount, said variable valve timing mechanism being actuated by a pressure of hydraulic fluid so as to change the valve timing; and said at least one parameter based on which the holding data is changed comprises one or more parameters that are related to a state of the hydraulic fluid.

42. A method according to claim 25, further comprising:

storing the control amount in a first memory as first holding data at the time when a deviation of an actual measurement value of the valve timing from the target value thereof is maintained less than a predetermined value, under a condition that the valve timing is in a first range in which the biasing device exerts the bias force;

storing the control amount in a second memory as second holding data at the time when the deviation of the actual measurement value of the valve timing from the target value thereof is maintained less than the predetermined value, under a condition that the valve timing is in a second range in which the biasing device does not exert the bias force; and calculating the control amount using the first holding data stored in the first memory when the valve timing is in the first range in which the biasing device exerts the bias force, and calculating the control amount using the second holding data stored in the second memory when the valve timing is in the second range in which the biasing device does not exert the bias force.

43. A method according to claim 42, further comprising changing the holding data based on at least one parameter that influences the holding data, in addition to the bias force of the biasing device.

44. A method according to claim 43, further comprising:

controlling a variable valve timing mechanism based on the control amount, said variable valve timing mechanism being actuated by a pressure of hydraulic fluid so as to change the valve timing; and said at least one parameter based on which the holding data is changed comprises one or more parameters that are related to a state of the hydraulic fluid.

* * * * *